(12) United States Patent
Barry et al.

(10) Patent No.: US 6,260,082 B1
(45) Date of Patent: Jul. 10, 2001

(54) METHODS AND APPARATUS FOR PROVIDING DATA TRANSFER CONTROL

(75) Inventors: Edwin Frank Barry, Cary; Edward A. Wolff, Chapel Hill, both of NC (US)

(73) Assignee: Bops, Inc., Chapel Hill, NC (US)

( * ) Notice: Subject to any disclaimer, the term of this patent is extended or adjusted under 35 U.S.C. 154(b) by 0 days.

(21) Appl. No.: 09/471,217

(22) Filed: Dec. 23, 1999

Related U.S. Application Data

(60) Provisional application No. 60/113,555, filed on Dec. 23, 1998.

(51) Int. Cl.$^7$ .................................................. G06F 13/00
(52) U.S. Cl. .................................. 710/22; 710/33; 712/10
(58) Field of Search .......................... 710/1, 5–7, 20–35; 712/10–23; 714/100

(56) References Cited

U.S. PATENT DOCUMENTS

| | | | |
|---|---|---|---|
| 5,067,075 | * 11/1991 | Sugano et al. | 710/25 |
| 5,375,218 | * 12/1994 | Umeda | 710/22 |
| 5,561,820 | * 10/1996 | Bland et al. | 710/27 |
| 5,590,377 | * 12/1996 | Smith | 710/22 |
| 5,765,024 | * 6/1998 | Riley | 710/22 |
| 5,838,993 | * 11/1998 | Riley et al. | 710/22 |
| 5,896,550 | * 4/1999 | Wehunt et al. | 710/26 |
| 5,905,912 | * 5/1999 | Story et al. | 710/27 |
| 5,944,800 | * 8/1999 | Mattheis et al. | 710/23 |
| 6,134,607 | * 10/2000 | Frink | 710/22 |

* cited by examiner

Primary Examiner—Christopher B. Shin
(74) Attorney, Agent, or Firm—Priest & Goldstein, PLLC

(57) ABSTRACT

A variety of advantageous mechanisms for improved data transfer control within a data processing system are described. A DMA controller is described which is implemented as a multiprocessing transfer engine supporting multiple transfer controllers which may work independently or in cooperation to carry out data transfers, with each transfer controller acting as an autonomous processor, fetching and dispatching DMA instructions to multiple execution units. In particular, mechanisms for initiating and controlling the sequence of data transfers are provided, as are processes for autonomously fetching DMA instructions which are decoded sequentially but executed in parallel. Dual transfer execution units within each transfer controller, together with independent transfer counters, are employed to allow decoupling of source and destination address generation and to allow multiple transfer instructions in one transfer execution unit to operate in parallel with a single transfer instruction in the other transfer unit. Improved flow control of data between a source and destination is provided through the use of special semaphore operations, signals and message synchronization which may be invoked explicitly using SIGNAL and WAIT type instructions or implicitly through the use of special "event-action" registers. Transfer controllers are also described which can cooperate to perform "DMA-to-DMA" transfers. Message-level synchronization can be used by transfer controllers to synchronize with each other.

3 Claims, 30 Drawing Sheets

FIG. 4C

| INSTRUCTION | OPERATION | DESCRIPTION |
|---|---|---|
| TRANSFER TYPE INSTRUCTIONS | | |
| TSI | TRANSFER SYSTEM INBOUND | LOAD CONTROL PARAMETERS FOR INBOUND TRANSFER FROM SDB TO INBOUND FIFO. |
| TCI | TRANSFER CORE INBOUND | LOAD CONTROL PARAMETERS FOR INBOUND TRANSFER FROM INBOUND FIFO TO A CORE MEMORY. |
| TSO | TRANSFER SYSTEM OUTBOUND | LOAD CONTROL PARAMETERS FOR OUTBOUND TRANSFER FROM OUTBOUND FIFO TO SDB. |
| TCO | TRANSFER CORE OUTBOUND | LOAD CONTROL PARAMETERS FOR OUTBOUND TRANSFER FROM CORE MEMORY TO OUTBOUND FIFO. |
| BRANCH TYPE INSTRUCTIONS | | |
| JMPcc | JUMP (PC-RELATIVE) CONDITIONAL | CONDITIONAL BRANCH TO A TPC-RELATIVE INSTRUCTION ADDRESS. |
| JMPDcc | JUMP (ABSOLUTE) CONDITIONAL | CONDITIONAL BRANCH TO AN ABSOLUTE TRANSFER INSTRUCTION ADDRESS (32 BIT). |
| CALLcc | CALL (PC-RELATIVE) CONDITIONAL | CONDITIONAL CALL. SAVE CURRENT TPC TO THE LINK PC (LINKPC) AND BRANCH TO A TPC-RELATIVE INSTRUCTION ADDRESS. |
| CALLDcc | CALL (ABSOLUTE) CONDITIONAL | CONDITIONAL CALL. SAVE CURRENT TPC TO THE LINK PC (LINKPC) AND BRANCH TO AN ABSOLUTE INSTRUCTION ADDRESS 32-BIT). |
| RETcc | RETURN CONDITIONAL | CONDITIONAL RETURN FROM CALL. RESTORE TPC FROM LINKPC AND FETCH THE NEXT INSTRUCTION FROM THE RESTORED ADDRESS. |
| STATE CONTROL TYPE INSTRUCTIONS | | |
| RESTART | RESUME TRANSFER | RESTART SPECIFIED TRANSFER UNITS (CTU AND/OR STU). |
| CLEAR | CLEAR TRANSFER UNIT | SET STU, CTU OR BOTH TO AN INACTIVE STATE. |
| NOP | NO OPERATION | NO OPERATION (SKIP THIS INSTRUCTION) |
| SYNCHRONIZATION TYPE INSTRUCTIONS | | |
| SIGNALcc | SIGNAL INTERRUPT, MESSAGE OR SEMAPHORE | SIGNAL WHEN A SEMAPHORE CONDITION IS TRUE. ALLOWS GENERAL CONDITIONAL SIGNALING USING INTERRUPTS, MESSAGE, OR SEMAPHORE UPDATES. |
| WAITcc | WAIT FOR SEMAPHORE CONDITION | WAIT WHILE A SEMAPHORE CONDITION IS TRUE. PROVIDES ATOMIC UPDATE. |
| LOAD TYPE INSTRUCTIONS | | |
| PEXLAT | LOAD PE TRANSLATE TABLE | LOAD PE ID TRANSLATION TABLE. THIS TABLE IS USED DURING PE ADDRESSING MODES TO TRANSLATE PE ADDRESS BITS |
| BITREV | LOAD "BIT-REVERSED" INDEX TRANSLATE TABLE | LOAD CONFIGURATION BITS WHICH SPECIFY AN ADDRESS TRANSLATION SUPPORTING BIT REVERSAL OF INDICES FOR FFT COMPUTATIONS. |
| LIMEAR | LOAD EAR REGISTERS | LOADS EVENT-ACTION REGISTERS WITH IMMEDIATE VALUES. SETS UP CONDITIONS WHICH WILL TRIGGER SPECIFIED SIGNALING ACTIONS IN THE FORM OF INTERRUPTS, MESSAGES AND/OR SEMAPHORE UPDATES. |
| LIMGR | LOAD IMMEDIATE GENERAL REGISTER | LOADS ONE OR MORE GENERAL REGISTERS (GR0-GR3) WITH IMMEDIATE VALUES. |
| LIMSEM | LOAD SEMAPHORE REGISTERS | THIS INSTRUCTION ALLOWS LOADING OF SEMAPHORE REGISTERS WITH IMMEDIATE VALUES. |

FIG. 4D

| 3 | 3 | 2 | 2 | 2 | 2 | 2 | 2 | 2 | 2 | 2 | 1 | 1 | 1 | 1 | 1 | 1 | 1 | 1 | 1 | 1 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|
| 1 | 0 | 9 | 8 | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 |
| TRANSFER PROGRAM COUNTER (TPC) REGISTER |||||||||||||||||||||||||||||| 0 | 0 |

459

THE TRANSFER PROGRAM COUNTER (TPC) CONTAINS THE SYSTEM ADDRESS OF THE NEXT TRANSFER PROGRAM INSTRUCTION TO BE FETCHED. THIS REGISTER MAY BE READ AT ANY TIME AND MAY BE WRITTEN WHEN THE PROCESSOR IS IN AN IDLE STATE (TPC==WAITPC) OR WAITING DUE TO A WAIT INSTRUCTION.

| 3 | 3 | 2 | 2 | 2 | 2 | 2 | 2 | 2 | 2 | 2 | 1 | 1 | 1 | 1 | 1 | 1 | 1 | 1 | 1 | 1 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|
| 1 | 0 | 9 | 8 | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 |
| WAIT PROGRAM COUNTER (WAITPC) REGISTER |||||||||||||||||||||||||||||| 0 | 0 |

THE WAITPC REGISTER SPECIFIES A VALUE SUCH THAT WHEN TPC IS EQUAL TO WAITPC, THE INSTRUCTION CONTROL UNIT STOPS FETCHING INSTRUCTIONS AND PAUSES. WHEN TPC IS NOT EQUAL TO WAITPC, THE INSTRUCTION CONTROL UNIT PROCEEDS INSTRUCTION FETCHING AND EXECUTION NORMALLY.

FIG. 4F1

Table 496:

| NAME | SYSTEM ADDRESS | DESCRIPTION |
|---|---|---|
| | TRANSFER CONTROLLER | |
| BASE ADDRESS (EXAMPLE) | 0x00708000 | |
| | REGISTER OFFSET | |
| RESUME | 0x03 | WRITE-ONLY ADDRESS. CAUSES THE TRANSFER CONTROLLER TO RESUME FETCHING AND DECODING INSTRUCTIONS WHEN IT IS IN THE WAIT STATE DUE TO A WAIT INSTRUCTION. THIS COMMAND OVERRIDES ANY CONDITION SPECIFIED IN THE WAIT INSTRUCTION. |
| CLEAR | 0x04 | WRITE-ONLY ADDRESS. CLEARS BOTH STU AND CTU OF TRANSFER PARAMETERS AND PLACES THEM IN THE INACTIVE STATE. |
| CLEARSTU | 0x05 | WRITE-ONLY ADDRESS. CLEARS STU OF TRANSFER PARAMETERS AND PLACES IT INTO THE INACTIVE STATE |
| CLEARCTU | 0x06 | WRITE-ONLY ADDRESS. CLEARS CTU OF TRANSFER PARAMETERS AND PLACES IT INTO THE INACTIVE STATE. |
| RESTART | 0x07 | WRITE-ONLY ADDRESS. CAUSE BOTH STU AND CTU TO PERFORM A RESTART. IF EITHER TRANSFER UNIT HAS A ZERO CURRENT TRANSFER COUNT, THEN IT CURRENT COUNT IS RELOADED FROM ITS INITIAL TRANSFER COUNT. THE CURRENT TRANSFER PARAMETERS ARE USED TO RESTART AND CONTINUE THE TRANSFER, AND ALL OTHER PARAMETERS REMAIN THE SAME. |
| RESTARTSTU | 0x08 | WRITE-ONLY ADDRESS. CAUSE STU TO PERFORM A RESTART. IF THE STC IS ZERO, RELOAD FROM ISTC. IF CTC HAS NON-ZERO TRANSFER COUNT, THEN CONTINUE TRANSFER. IF CTC HAS ZERO TRANSFER COUNT, REMAIN IN CURRENT TRANSFER STATE. |
| RESTARTCTU | 0x09 | WRITE-ONLY ADDRESS. CAUSE CTU TO PERFORM A RESTART. IF THE CTC IS ZERO, RELOAD FROM ICTC. IF STC HAS NON-ZERO TRANSFER COUNT, THEN CONTINUE TRANSFER. IF STC HAS ZERO TRANSFER COUNT, REMAIN IN CURRENT TRANSFER STATE. |
| RESET | 0x20 | WRITE-ONLY ADDRESS. CAUSES RESET OF TRANSFER CONTROLLER. ALL REGISTERS INTIALIZED. TPC SET EQUAL TO WAITPC. |
| INITSTC | 0x30 | WRITE-ONLY ADDRESS + DATA (UPDATES BOTH STC AND ISTC). |
| INITSTC_START | 0x31 | WRITE-ONLY ADDRESS + DATA (UPDATES BOTH STC AND ISTC, THEN RESTARTS TRANSFER) |
| INITCTC | 0x34 | WRITE-ONLY ADDRESS + DATA (UPDATES BOTH CTC AND ICTC). |
| INITCTC_START | 0x35 | WRITE-ONLY ADDRESS + DATA (UPDATES BOTH CTC AND ICTC, THEN RESTARTS TRANSFER) |
| WRITESTC | 0x38 | WRITE-ONLY ADDRESS + DATA (UPDATES BOTH STC, NOT ISTC). |
| WRITESTC_START | 0x39 | WRITE-ONLY ADDRESS + DATA (UPDATES BOTH STC, NOT ISTC, THEN RESTARTS TRANSFER) |

FIG. 4F2

| | | |
|---|---|---|
| WRITECTC | 0x3c | WRITE-ONLY ADDRESS + DATA (UPDATES ONLY CTC NOT ICTC). |
| WRITECTC_START | 0x3d | WRITE-ONLY ADDRESS + DATA (UPDATES ONLY CTC NOT ICTC, THEN RESTARTS TRANSFER) |
| LOCKID0 | 0x50 | READ-ADDRESS. READ RETURNS 1 IF LOCKED, 0 IF NOT LOCKED (LOCK GRANTED) |
| LOCKID1 | 0x51 | READ-ADDRESS. READ RETURNS 1 IF LOCKED, 0 IF NOT LOCKED (LOCK GRANTED) |
| LOCKID2 | 0x52 | READ-ADDRESS. READ RETURNS 1 IF LOCKED, 0 IF NOT LOCKED (LOCK GRANTED) |
| LOCKID3 | 0x53 | READ-ADDRESS. READ RETURNS 1 IF LOCKED, 0 IF NOT LOCKED (LOCK GRANTED) |
| LOCKID4 | 0x54 | READ-ADDRESS. READ RETURNS 1 IF LOCKED, 0 IF NOT LOCKED (LOCK GRANTED) |
| LOCKID5 | 0x55 | READ-ADDRESS. READ RETURNS 1 IF LOCKED, 0 IF NOT LOCKED (LOCK GRANTED) |
| LOCKID6 | 0x56 | READ-ADDRESS. READ RETURNS 1 IF LOCKED, 0 IF NOT LOCKED (LOCK GRANTED) |
| LOCKID7 | 0x57 | READ-ADDRESS. READ RETURNS ZERO IF LOCKED, 8 IF NOT LOCKED (LOCK GRANTED) |
| UWAITS0 | 0x60 | READ-ADDRESS. IF SPECIFIED SEMAPHORE IS ZERO, RETURNS 0 FOR THE READ. IF SPECIFIED SEMAPHORE IS NON-ZERO, RETURN VALUE AND DECREMENT SEMAPHORE. |
| INCS0 | 0x60 | WRITE ADDRESS. INCREMENT SPECIFIED SEMAPHORE. |
| UWAITS1 | 0x61 | READ-ADDRESS. IF SPECIFIED SEMAPHORE IS ZERO, RETURNS 0 FOR THE READ. IF SPECIFIED SEMAPHORE IS NON-ZERO, RETURN VALUE AND DECREMENT SEMAPHORE. |
| INCS1 | 0x61 | WRITE ADDRESS. INCREMENT SPECIFIED SEMAPHORE. |
| UWAITS2 | 0x62 | READ-ADDRESS. IF SPECIFIED SEMAPHORE IS ZERO, RETURNS 0 FOR THE READ. IF SPECIFIED SEMAPHORE IS NON-ZERO, RETURN VALUE AND DECREMENT SEMAPHORE. |
| INCS2 | 0x62 | WRITE ADDRESS. INCREMENT SPECIFIED SEMAPHORE. |
| UWAITS3 | 0x63 | READ-ADDRESS. IF SPECIFIED SEMAPHORE IS ZERO, RETURNS 0 FOR THE READ. IF SPECIFIED SEMAPHORE IS NON-ZERO, RETURN VALUE AND DECREMENT SEMAPHORE. |
| INCS3 | 0x63 | WRITE ADDRESS. INCREMENT SPECIFIED SEMAPHORE. |
| SWAITS0 | 0x64 | READ-ADDRESS. SEMAPHORE IS TREATED AS A SIGNED TWO-COMPLEMENT INTEGER. IF SPECIFIED SEMAPHORE IS GREATER THAN ZERO, RETURN ITS VALUE THEN DECREMENT BY 1. IF LESS THAN OR EQUAL TO ZERO, RETURN VALUE AND DO NOT DECREMENT. |
| DECS0 | 0x64 | WRITE ADDRESS. DECREMENT SPECIFIED SEMAPHORE. |
| SWAITS1 | 0x65 | READ-ADDRESS. SEMAPHORE IS TREATED AS A SIGNED TWO-COMPLEMENT INTEGER. IF SPECIFIED SEMAPHORE IS GREATER THAN ZERO, RETURN ITS VALUE THEN DECREMENT BY 1. IF LESS THAN OR EQUAL TO ZERO, RETURN VALUE AND DO NOT DECREMENT. |
| DECS1 | 0x65 | WRITE ADDRESS. DECREMENT SPECIFIED SEMAPHORE. |

FIG. 4F3

| | | |
|---|---|---|
| SWAITS2 | 0x66 | READ-ADDRESS. SEMAPHORE IS TREATED AS A SIGNED TWO-COMPLEMENT INTEGER. IF SPECIFIED SEMAPHORE IS GREATER THAN ZERO, RETURN ITS VALUE THEN DECREMENT BY 1. IF LESS THAN OR EQUAL TO ZERO, RETURN VALUE AND DO NOT DECREMENT. |
| DECS2 | 0x66 | WRITE ADDRESS. DECREMENT SPECIFIED SEMAPHORE. |
| SWAITS3 | 0x67 | READ-ADDRESS. SEMAPHORE IS TREATED AS A SIGNED TWO-COMPLEMENT INTEGER. IF SPECIFIED SEMAPHORE IS GREATER THAN ZERO, RETURN ITS VALUE THEN DECREMENT BY 1. IF LESS THAN OR EQUAL TO ZERO, RETURN VALUE AND DO NOT DECREMENT. |
| DECS3 | 0x67 | WRITE ADDRESS. DECREMENT SPECIFIED SEMAPHORE. |
| CLEARS0 | 0x68 | READ ADDRESS. READ CAUSES CLEAR OF SPECIFIED SEMAPHORE. RETURNS VALUE PRIOR TO CLEARING. |
| SETS0 | 0x68 | WRITE ADDRESS. WRITE CAUSES SET OF SPECIFIED SEMAPHORE TO A VALUE OF 1. |
| CLEARS1 | 0x69 | READ ADDRESS. READ CAUSES CLEAR OF SPECIFIED SEMAPHORE. RETURNS VALUE PRIOR TO CLEARING. |
| SETS1 | 0x69 | WRITE ADDRESS. WRITE CAUSES SET OF SPECIFIED SEMAPHORE TO A VALUE OF 1. |
| CLEARS2 | 0x6a | READ ADDRESS. READ CAUSES CLEAR OF SPECIFIED SEMAPHORE. RETURNS VALUE PRIOR TO CLEARING. |
| SETS2 | 0x6a | WRITE ADDRESS. WRITE CAUSES SET OF SPECIFIED SEMAPHORE TO A VALUE OF 1. |
| CLEARS3 | 0x6b | READ ADDRESS. READ CAUSES CLEAR OF SPECIFIED SEMAPHORE. RETURNS VALUE PRIOR TO CLEARING. |
| SETS3 | 0x6b | WRITE ADDRESS. WRITE CAUSES SET OF SPECIFIED SEMAPHORE TO A VALUE OF 1. |
| INITPC | 0x100 | WRITE-ONLY ADDRESS + DATA. VALUE IS WRITTEN TO BOTH TPC AND WAITPC AND IS INTERPRETED AS A DMA INSTRUCTION ADDRESS. |
| WAITPC | 0x104 | READ/WRITE WAITPC REGISTER. |
| TPC | 0x108 | READ/WRITE TPC REGISTER. |
| LINKPC | 0x10c | READ/WRITE ADDRESS FOR LINKPC REGISTER. |
| SEM | 0x110 | READ/WRITE SEM (S0,S1,S2,S3) REGISTER. |
| EAR0 | 0x114 | READ/WRITE ADDRESS FOR EAR0 REGISTER. |
| EAR1 | 0x118 | READ/WRITE ADDRESS FOR EAR1 REGISTER. |
| BITREV | 0x11c | READ/WRITE ADDRESS FOR "BIT-REVERSE" ADDRESS MODE REGISTER. |
| GR0 | 0x120 | READ/WRITE GENERAL REGISTER 0 |
| GR1 | 0x124 | READ/WRITE GENERAL REGISTER 1 |
| GR2 | 0x128 | READ/WRITE GENERAL REGISTER 2 |
| GR3 | 0x12c | READ/WRITE GENERAL REGISTER 3 |
| PETABLE | 0x130 | READ/WRITE ADDRESS PE ID TRANSLATION TABLE |
| ITCNT | 0x134 | READ/WRITE ADDRESS FOR INITIAL TRANSFER COUNT REGISTER (CONTAINS BOTH ISTC AND ICTC). |

FIG. 4F4

| TCNT | 0x138 | READ/WRITE ADDRESS FOR CURRENT TRANSFER COUNT REGISTER (CONTAINS BOTH STC AND CTC). |
|---|---|---|
| LOCK | 0x13c | READ-ONLY ADDRESS FOR RETURNING CURRENT OWNER OF THE WAITPC LOCK. |
| TSR | 0x140 | READ-ONLY. TRANSFER CONTROLLER STATUS REGISTER. |
| EXTSIG | 0x150 | READ/WRITE EXTERNAL SIGNAL SELECT AND ENABLE REGISTER. |

| | |
|---|---|
| SEMAPHORE CONDITION | ALWAYS |
| | EQUAL |
| | NOT EQUAL |
| | HIGHER THAN |
| | HIGHER THAN OR EQUAL |
| | LOWER THAN |
| | LOWER THAN OR EQUAL |
| | CTUeot (CTU AT END-OF-TRANSFER) |
| | STUeot (STU AT END-OF-TRANSFER) |
| | NotCTUeot (CTU NOT AT END-OF-TRANSFER) |
| | NotSTUeot (STU NOT AT END-OF-TRANSFER) |
| | GREATER THAN OR EQUAL |
| | GREATER THAN |
| | LESS THAN OR EQUAL |
| | LESS THAN |

| 31 30 29 28 27 26 25 24 | 23 22 21 20 19 18 17 16 | 15 14 13 12 11 10 9 8 | 7 6 5 4 3 2 1 0 |
|---|---|---|---|
| S3 | S2 | S1 | S0 |

THE SEMAPHORE REGISTERS ARE USED TO GENERATE CONDITIONS FOR ALL CONDITIONAL INSTRUCTIONS, AND PROCESSOR-TRANSFER SYNCHRONIZATION. THESE REGISTERS MAY BE READ/WRITTEN (AS A GROUP) DIRECTLY AT THE SEM ADDRESS, OR INDIRECTLY AT OTHER READ/WRITE ADDRESSES WHICH CAUSE SPECIFIC SEMAPHORE SIDE-EFFECTS. THE LIMSEM INSTRUCTION ALSO MAY BE USED TO LOAD AN IMMEDIATE VALUE INTO ANY OR ALL OF THESE REGISTERS. DIFFFERENT IMPLEMENTATIONS MAY HAVE A GREATER OR LESSER NUMBER OF SEMAPHORE REGISTERS AND THERE IS NO SPECIAL RESTRICTION ON SIZE. A PREFERRED EMBODIMENT USES FOUR 8-BIT SEMAPHORE REGISTERS.

| S0 | SEMAPHORE REGISTER 0 |
|---|---|
| S1 | SEMAPHORE REGISTER 1 |
| S2 | SEMAPHORE REGISTER 2 |
| S3 | SEMAPHORE REGISTER 3 |

| | |
|---|---|
| tsi.block tc=200, addr=0x00010000; | TRANSFER-SYSTEM-INBOUND. STU RECEIVES THIS INSTRUCTION AND LOADS PARAMETERS. TRANSFER FROM SYSTEM DATA BUS TO INBOUND DATA QUEUE (IDQ). TRANSFER COUNT IS 200 UNITS, SYSTEM DATA BUS ADDRESS IS 0x00010000; |
| tci.block.x tc=200, addr=0x0010; | TRANSFER-CORE-INBOUND INSTRUCTION. CTU RECEIVES THIS INSTRUCTION AND LOADS PARAMETERS. TRANSFER FROM INPUT DATA QUEUE TO THE DMA BUS USING BLOCK ADDRESS MODE (SEQUENTIAL ADDRESSES). TRANSFER COUNT IS 100 UNITS AND STARTING DMA BUS ADDRESS IS 0x0010. THE '.X' EXTENSION CAUSES THE "EXECUTE" BIT TO BE SET SO THAT BOTH THE STU AND CTU ARE STARTED IMMEDIATELY AFTER LOADING THIS INSTRUCTION. |

| | |
|---|---|
| tsi.block tc=200, addr=0x00010000; | TRANSFER-SYSTEM-INBOUND. STU RECEIVES THIS INSTRUCTION AND LOADS PARAMETERS. TRANSFER FROM SYSTEM DATA BUS TO INBOUND DATA QUEUE (IDQ). TRANSFER COUNT IS 200 UNITS, SYSTEM DATA BUS ADDRESS IS 0x00010000; |
| tci.block tc=200, addr=0x0010; | TRANSFER-CORE-INBOUND INSTRUCTION. CTU RECEIVES THIS INSTRUCTION AND LOADS PARAMETERS. TRANSFER FROM INPUT DATA QUEUE TO THE DMA BUS USING BLOCK ADDRESS MODE (SEQUENTIAL ADDRESSES). TRANSFER COUNT IS 100 UNITS AND STARTING DMA BUS ADDRESS IS 0x0010. SINCE THERE IS NO "x" EXTENSION, THE TRANSFER DOES NOT BEGIN IMMEDIATELY. |
| WAIT; | WAIT UNTIL HOST PROCESSOR PERFORMS A RESTART ACTION. |

FIG. 9B

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 0 9 | 0 8 | 0 7 | 0 6 | 0 5 | 0 4 | 0 3 | 0 2 | 0 1 | 0 0 |
|---|---|---|---|---|---|---|---|---|---|---|---|---|---|---|---|---|---|---|---|---|---|---|---|---|---|---|---|---|---|---|---|
| INITIAL SYSTEM TRANSFER COUNT (ISTC) | | | | | | | | | | | | | | | | INITIAL CORE TRANSFER COUNT (ICTC) | | | | | | | | | | | | | | | |

986

THE INITIAL TRNASFER COUNT (ITCNT) REGISTER CONTAIN THE INITIAL TRNASFER COUNT VALUES FOR THE STU AND CTU. THESE COUNT VALUES ARE REFERRED TO AS THE ISTC AND ICTC. THIS REGISTER MAY BE WRITTEN, BUT ONLY WHEN THE TRANSFER CONTROLLER IS NOT EXECUTING AN INSTRUCTION.

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 0 9 | 0 8 | 0 7 | 0 6 | 0 5 | 0 4 | 0 3 | 0 2 | 0 1 | 0 0 |
|---|---|---|---|---|---|---|---|---|---|---|---|---|---|---|---|---|---|---|---|---|---|---|---|---|---|---|---|---|---|---|---|
| SYSTEM TRANSFER COUNT (STC) | | | | | | | | | | | | | | | | CORE TRANSFER COUNT (CTC) | | | | | | | | | | | | | | | |

THE TCNT REGISTER (WHICH CONTAINS THE CURRENT STU AND CTU TRANSFER COUNTS) IS A READ-ONLY REGISTER. THE INDIVIDUAL COUNTS MAY BE UPDATED BY WRITES TO SPECIAL COMMAND ADDRESSES (WRITESTC AND WRITECTC) WITH THE ABILITY TO GENERATE A RESTART OPERATION.

FIG. 9D

| | |
|---|---|
| tso.block tc =200, addr=0x00010000; | TRANSFER-SYSTEM-INBOUND. STU RECEIVES THIS INSTRUCTION AND LOADS PARAMETERS. TRANSFER FROM ODQ TO SYSTEM DATA BUS. TRANSFER COUNT IS 200 UNITS, SYSTEM DATA BUS ADDRESS IS 0x00010000; |
| tso.block.x tc =50, addr=0x00000310; | TRANSFER-CORE-OUTBOUND INSTRUCTION. TRANSFER 50 DATA ELEMENTS, FROM SPECIFIED LOCAL MEMORY ADDRESS IN BLOCK ADDRESSING MODE. START TRANSFER IMMEDIATELY. |
| tso.block.x tc=50, addr=0x00200400; | TRANSFER-CORE-OUTBOUND INSTRUCTION. TRANSFER 50 DATA ELEMENTS, FROM SPECIFIED LOCAL MEMORY ADDRESS IN BLOCK ADDRESSING MODE. START TRANSFER IMMEDIATELY. |
| tso.stride.x tc=50, addr=0x00210200, sride=16, hold=10; | TRANSFER-CORE-OUTBOUND INSTRUCTION. TRANSFER 50 DATA ELEMENTS, FROM SPECIFIED LOCAL MEMORY ADDRESS IN STRIDE ADDRESSING MODE. START TRANSFER IMMEDIATELY. |
| tso.circ.x tc=50, addr=0x00230600, bufinit=0, bufsize=128; | TRANSFER-CORE-OUTBOUND INSTRUCTION. TRANSFER 50 DATA ELEMENTS, FROM SPECIFIED LOCAL MEMORY ADDRESS IN CIRCULAR ADDRESSING MODE. START TRANSFER IMMEDIATELY. |
| wait; | WAIT HERE AFTER TRANSFERS. |

| | |
|---|---|
| tso.block tc =200, addr=0x00010000; | TRANSFER-CORE-OUTBOUND. CTU RECEIVES THIS INSTRUCTION AND LOADS PARAMETERS. TRANSFER FROM DMA BUS TO ODQ. TRANSFER COUNT IS 200 UNITS, DMA BUS ADDRESS IS 0x00010000; |
| tso.block.x tc =50, addr=0x00000310; | TRANSFER-SYSTEM-OUTBOUND INSTRUCTION. TRANSFER 50 DATA ELEMENTS, FROM ODQ TO SPECIFIED SDB ADDRESS IN BLOCK ADDRESSING MODE. START TRANSFER IMMEDIATELY. |
| tso.block.x tc=50, addr=0x00200400; | TRANSFER-SYSTEM-OUTBOUND INSTRUCTION. TRANSFER 50 DATA ELEMENTS, FROM ODQ TO SPECIFIED SDB ADDRESS IN BLOCK ADDRESSING MODE. START TRANSFER IMMEDIATELY. |
| tso.stride.x tc=50, addr=0x00210200, sride=16, hold=10; | TRANSFER-SYSTEM-OUTBOUND INSTRUCTION. TRANSFER 50 DATA ELEMENTS, FROM ODQ TO SPECIFIED SDB ADDRESS IN STRIDE ADDRESSING MODE. START TRANSFER IMMEDIATELY. |
| tso.circ.x tc=50, addr=0x00230600, bufinit=0, bufsize=128; | TRANSFER-SYSTEM-OUTBOUND INSTRUCTION. TRANSFER 50 DATA ELEMENTS, FROM ODQ TO SPECIFIED SDB ADDRESS IN CIRCULAR ADDRESSING MODE. START TRANSFER IMMEDIATELY. |
| wait; | WAIT HERE AFTER TRANSFERS. |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| RESERVED | | | | | | | | | | | | | | | | S3 SigEn | S3 ExtSig Select | | | | S2 SigEn | S2 ExtSig Select | | | | S1 SigEn | S1 ExtSig Select | | | | S0 SigEn | S0 ExtSig Select | | | |

| | |
|---|---|
| THE EXTERNAL SIGNAL REGISTER ALLOWS THE SELECTION OF 1 OUT OF N EXTERNAL INPUT SIGNALS WHICH, WHEN ASSERTED FOR ONE CLOCK-CYCLE, WILL CAUSE THE CORRESPONDING SEMAPHORE TO BE INCREMENTED BY 1. THE ABOVE REGISTER ALLOWS FOR UP TO 8 EXTERNAL SIGNALS, ONE OF WHICH CAN BE ROUTED AS A SIGNAL INPUT TO EACH SEMAPHORE REGISTER. | |
| S0 ExtSig Select | S0 EXTERNAL SIGNAL SELECT. SPECIFIES WHICH OF 8 EXTERNAL INPUT SIGNALS WILL GENERATE A SIGNAL TO UPDATE SEMAPHORE REGISTER. (SEE TABLE BELOW) |
| S0 SigEn | S0 EXTERNAL SIGNAL ENABLE.<br>0 = DISABLED. EXTERNAL SIGNAL HAS NO EFFECT ON SEMAPHORE.<br>1 = ENABLED. WHEN EXTERNAL SIGNAL SPECIFIED BY S0 ExtSig Select IS ASSERTED HIGH FOR 1 CLOCK PERIOD, SEMAPHORE REGISTER S0 IN INCREMENTED. |
| S1 ExtSig Select | S1 EXTERNAL SIGNAL SELECT. SPECIFIES WHICH OF 8 EXTERNAL INPUT SIGNALS WILL GENERATE A SIGNAL TO UPDATE SEMAPHORE REGISTER. (SEE TABLE BELOW) |
| S1 SigEn | S1 EXTERNAL SIGNAL ENABLE.<br>0 = DISABLED. EXTERNAL SIGNAL HAS NO EFFECT ON SEMAPHORE.<br>1 = ENABLED. WHEN EXTERNAL SIGNAL SPECIFIED BY S1 ExtSig Select IS ASSERTED HIGH FOR 1 CLOCK PERIOD, SEMAPHORE REGISTER S1 IN INCREMENTED. |
| S2 ExtSig Select | S2 EXTERNAL SIGNAL SELECT. SPECIFIES WHICH OF 8 EXTERNAL INPUT SIGNALS WILL GENERATE A SIGNAL TO UPDATE SEMAPHORE REGISTER. (SEE TABLE BELOW) |
| S2 SigEn | S2 EXTERNAL SIGNAL ENABLE.<br>0 = DISABLED. EXTERNAL SIGNAL HAS NO EFFECT ON SEMAPHORE.<br>1 = ENABLED. WHEN EXTERNAL SIGNAL SPECIFIED BY S2 ExtSig Select IS ASSERTED HIGH FOR 1 CLOCK PERIOD, SEMAPHORE REGISTER S2 IN INCREMENTED. |
| S3 ExtSig Select | S3 EXTERNAL SIGNAL SELECT. SPECIFIES WHICH OF 8 EXTERNAL INPUT SIGNALS WILL GENERATE A SIGNAL TO UPDATE SEMAPHORE REGISTER. (SEE TABLE BELOW) |
| S3 SigEn | S3 EXTERNAL SIGNAL ENABLE.<br>0 = DISABLED. EXTERNAL SIGNAL HAS NO EFFECT ON SEMAPHORE.<br>1 = ENABLED. WHEN EXTERNAL SIGNAL SPECIFIED BY S3 ExtSig Select IS ASSERTED HIGH FOR 1 CLOCK PERIOD, SEMAPHORE REGISTER S3 IN INCREMENTED. |

| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 0 9 | 0 8 | 0 7 | 0 6 | 0 5 | 0 4 | 0 3 | 0 2 | 0 1 | 0 0 |
|---|---|---|---|---|---|---|---|---|---|---|---|---|---|---|---|---|---|---|---|---|---|---|---|---|---|---|---|---|---|---|---|
| | | | | | | | | | | | | | | | | | | | | | | E1 EVENTS | | | | | | E0 EVENTS | | | |
| RESERVED | | | | STU Re- start Sem | | STU Re- start CC | | CTU Re- start Sem | | CTU Re- start CC | | RSRVD | | | | | | | | E1TPCWait | E1eot | E1STUeot | E1CTUeot | RSRVD | | | | E0TPCWait | E0eot | E0STUeot | E0CTUeot |

| | |
|---|---|
| EOCTUeot | 1 = TRIGGER E0 ACTION(S) WHEN CTUeot BECOMES TRUE (CTC:1→0) |
| EOSTUeot | 1 = TRIGGER E0 ACTION(S) WHEN STUeot BECOMES TRUE (STC:1→0) |
| EOTCzero | 1 = TRIGGER E0 ACTION(S) WHEN BOTH CTC AND STC BECOME ZERO. (THE LATER COUNTER TO REACH ZERO TRIGGERS THE ACTION. IF THIS BIT IS SET, EOCTUeot AND EOSTCeot ARE IGNORED. |
| EOTPCWait | 1 = TRIGGER E0 ACTION(S) WHEN TPC BECOMES EQUAL WAITPC. |
| EOIncDreg | 0 = NO POST-INCREMENT OF DREG<br>1 = POST-INCREMENT DREG IF IT IS A GENERAL REGISTER (GR0-GR3 ONLY) |
| E1CTUeot | 1 = TRIGGER E1 ACTION(S) WHEN CTUeot BECOMES TRUE (CTC:1→0) |
| E1STUeot | 1 = TRIGGER E1 ACTION(S) WHEN STUeot BECOMES TRUE (STS:1→0) |
| E1TCzero | 1 = TRIGGER E1 ACTION(S) WHEN BOTH CTC AND STC BECOME ZERO. |
| E1TPCWait | 1 = TRIGGER E1 ACTION(S) WHEN TPC BECOMES EQUAL WAITPC. |
| E1IncDreg | 0 = NO POST-INCREMENT OF DREG<br>1 = POST-INCREMENT DREG IF IT IS A GENERAL REGISTER (GR0-GR3 ONLY) |
| CTU RestartCC | THIS FIELD SPECIFIES THE CONDITION WHICH, WHEN TRUE, CAUSES THE CTU TO RESTART AUTOMATICALLY (IF IT HOLD VALID TRANSFER PARAMETERS), AND UPDATES THE SEMAPHORE SPECIFIED BY CTURestartSem.<br>00 = DECREMENT 'CTURestartSem' WHEN CONDITION (Sem! = 0) BECOMES TRUE, AND INITIATE A CTU RESTART OPERATION.<br>01 = RESERVED<br>10 = RESERVED<br>11 = NO RESTART OPERATION |
| CTU RestartSem | SPECIFIES THE SEMAPHORE TO TEST FOR ZERO TO OBTAIN A TRUTH VALUE FOR CTURestartCC WHEN THE CTUWaitCC FIELD IS 00.<br>00 = S0<br>01 = S1<br>10 = S2<br>11 = S3 |
| STU RestartCC | THIS FIELD SPECIFIES THE CONDITION WHICH, WHEN TRUE, CAUSES THE STU TO RESTART AUTOMATICALLY (IF IT HOLD VALID TRANSFER PARAMETERS), AND UPDATES THE SEMAPHORE SPECIFIED BY STURestartSem.<br>00=DECREMENT 'STURestartSem' WHEN CONDITION (Sem!=0) BECOMES TRUE AND INITIATE A STU RESTART OPERATION.<br>01 = RESERVED<br>10 = RESERVED<br>11 = NO RESTART OPERATION |
| STU RestartSem | SPECIFIES THE SEMAPHORE TO TEST FOR ZERO TO OBTAIN A TRUTH VALUE FOR STU RestartCC<br>00 = S0<br>01 = S1<br>10 = S2<br>11 = S3 |

FIG. 9H1

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| SIGNAL Opcode | | | | | | | Sig mod | | Cond Sem ID | | Cond Sem Op | | SCondition | | | | Rsvd | | | | Sem ID | | Sem Op | | Sig1 | Sig0 | Areg | | | | Dreg | |

| IMMEDIATE ADDRESS (PRESENT ONLY WHEN Smod = x10, x11) |
|---|
| IMMEDIATE DATA (PRESENT ONLY WHEN Smod = x01, x11) |

| | |
|---|---|
| | THE SIGNAL INSTRUCTION PROVIDES A MEANS FOR UPDATING A SEMAPHORE, ASSERTING INTERRUPT SIGNALS AND/OR SENDING A MESSAGE ON THE SCB SYNCHRONOUS WITH THE DMA INSTRUCTION STREAM. |
| Sogmod | 00 = INDIRECT ADDRESS (ADDRESS IN REG 'Areg'), INDIRECT DATA (DATA IN REG 'Dreg')<br>01 = INDIRECT ADDRESS(ADDRESS IN REG 'Areg'), IMMEDIATE DATA (NEXT INST WORD)<br>10 = IMMEDIATE ADDRESS (NEXT INST WORD), INDIRECT DATA (DATA IN REG 'Dreg')<br>11 = IMMEDIATE ADDRESS (NEXT INST WORD),IMMEDIATE DATA (WORD FOLLOWING IMMEDIATE ADDRESS). |
| Cond SemID | SEMAPHORE ID. THIS SPECIFIES WHICH SEMAPHORE IS USED IN THE CONDITION COMPARISON.<br>00 = S0<br>01 = S1<br>10 = S2<br>11 = S3 |
| Cond SemOp | SPECIFIES OPERATION TO PERFORM ON THE SEMAPHORE IF CONDITION IS TRUE.<br>00 = NO CHANGE TO SEMAPHORE<br>01 = DECREMENT THE SEMAPHORE BY 1<br>10 = INCREMENT THE SEMAPHORE BY 1<br>11 = CLEAR SEMAPHORE TO ZERO |
| SCondition | CONDITION WHICH, IF TRUE, ALLOWS THE SIGNAL TO OCCUR. SAME AS WAIT CONDITIONS, AND ASSUMES A COMPARISON WITH ZERO. |
| Sig0 | 1 = ASSERT INTERRUPT SIGNAL 0 HIGH FOR TWO CLOCK CYCLES, THEN LOW.<br>0 = DO NOT ASSERT. |
| Sig1 | 1 = ASSERT INTERRUPT SIGNAL 1 HIGH FOR TWO CLOCK CYCLES, THEN LOW.<br>0 = DO NOT ASSERT |
| Areg | WHEN Sigmod = 00 OR Sigmod = 01, SPECIFIES AN INTERNAL REGISTER (GR0-GR3) WHOSE CONTENTS SPECIFY AN ADDRESS ON THE SYSTEM CONTROL BUS TO WHICH DATA IS TO BE SENT. NOT USED IF Dreg = '1111' |

FIG. 9H2

| Dreg | WHEN Sigmod = 00 OR Sigmod = 10 (INDIRECT DATA), THIS FIELD SPECIFIES THE REGISTER TO BE SENT AS DATA ON THE SYSTEM CONTROL BUS. IF THIS FIELD CONTAINS '1111', THEN NO MESSAGE IS SENT REGARDLESS OF THE VALUE OF Sigmod. THE FOLLOWING REGISTER ASSIGNMENTS INDICATE THAT SEVERAL INTERNAL REGISTERS MAY BE USED AS MESSAGE DATA, INCLUDING GRx REGISTERS, TSR (STATUS) REGISTERS, TPC REGISTER AND THE SEM (SEMAPHORE) REGISTER. |
|---|---|
| | 0000-GR0 |
| | 0001-GR1 |
| | 0010-GR2 |
| | 0011-GR3 |
| | 1000-TSR0 |
| | 1001-TSR1 |
| | 1010-TSR2 |
| | 1011-TSR3 |
| | 1100-TPC |
| | 1101-SEM |
| | 1111-DO NOT SEND MESSAGE |
| Sem ID | SPECIFIES A SEMAPHORE TO UPDATE WHEN SIGNAL IS PERFORMED.<br>00 = SEMAPHORE 0<br>01 = SEMAPHORE 1<br>10 = SEMAPHORE 2<br>11 = SEMAPHORE 3 |
| Sem Op | 00 = NO CHANGE TO SEMAPHORE<br>01 = DECREMENT THE SEMAPHORE BY 1<br>10 = INCREMENT THE SEMAPHORE BY 1<br>11 = CLEAR SEMAPHORE TO ZERO |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| \multicolumn{16}{c\|}{E1 ACTIONS} | \multicolumn{16}{c\|}{E0 ACTIONS} |
| \multicolumn{4}{c\|}{E1 S3 Op} | \multicolumn{4}{c\|}{E1 S2 Op} | \multicolumn{4}{c\|}{E1 S1 Op} | E1Sig1 | E1Sig0 | \multicolumn{4}{c\|}{E1 Areg} | \multicolumn{4}{c\|}{E1 Dreg} | \multicolumn{4}{c\|}{E0 S3 Op} | \multicolumn{4}{c\|}{E0 S2 Op} | \multicolumn{4}{c\|}{E0 S1 Op} | \multicolumn{4}{c\|}{E0 S0 Op} | E0Sig1 | E0Sig0 | \multicolumn{4}{c\|}{E0 Areg} | \multicolumn{4}{c\|}{E0 Dreg} |

| | |
|---|---|
| E0 Dreg | SPECIFIES A REGISTER TO BE SENT (IF NOT '1111') AS MESSAGE DATA WHEN E0 EVENT OCCURS. |
| | 0000-GR0 |
| | 0001-GR1 |
| | 0010-GR2 |
| | 0011-GR3 |
| | 1000-TSR0 |
| | 1001-TSR1 |
| | 1010-TSR2 |
| | 1011-TSR3 |
| | 1100-TPC |
| | 1101-SEM |
| | 1111-DO NOT SEND MESSAGE |
| E0 Areg | SPECIFIES A REGISTER WHICH PROVIDES THE MESSAGE ADDRESS WHEN E0 EVENT OCCURS. |
| | 00-GR0 |
| | 01-GR1 |
| | 10-GR2 |
| | 11-GR3 |
| E0Sig0 | 0 = DO NOT ASSERT INTERRUPT SIGNAL 0.<br>1 = ASSERT INTERRUPT SIGNAL 0 ACTIVE 1 FOR 2 CYCLES WHEN E0 EVENT OCCURS |
| E0Sig1 | 0 = DO NOT ASSERT INTERRUPT SIGNAL 1.<br>1 = ASSERT INTERRUPT SIGNAL 1 ACTIVE 1 FOR 2 CYCLES WHEN E0 EVENT OCCURS |
| E0 S0-S3 Op | EACH 2-BIT FIELD SPECIFIES THE ACTION WHEN E0 EVENT OCCURS, ONE FIELD PER SEMAPHORE:<br>00 = NO CHANGE TO SEMAPHORE<br>01 = DECREMENT THE SEMAPHORE BY 1<br>10 = INCREMENT THE SEMAPHORE BY 1<br>11 = CLEAR SEMAPHORE TO ZERO |
| E1 Dreg | SPECIFIES A REGISTER TO BE SENT (IF NOT '1111') AS MESSAGE DATA WHEN E1 EVENT OCCURS. |
| | 0000-GR0 |
| | 0001-GR1 |
| | 0010-GR2 |
| | 0011-GR3 |
| | 1000-TSR0 |
| | 1001-TSR1 |
| | 1010-TSR2 |
| | 1011-TSR3 |
| | 1100-TPC |
| | 1101-SEM |
| | 1111-DO NOT SEND MESSAGE |

FIG. 9I2

| E1 Areg | SPECIFIES A REGISTER WHICH PROVIDES THE MESSAGE ADDRESS WHEN E1 EVENT OCCURS. |
| --- | --- |
| | 00-GR0 |
| | 01-GR1 |
| | 10-GR2 |
| | 11-GR3 |
| E1Sig0 | 0 = DO NOT ASSERT INTERRUPT SIGNAL 0.<br>1 = ASSERT INTERRUPT SIGNAL 0 ACTIVE 1 FOR 2 CYCLES WHEN E1 EVENT OCCURS. |
| E1Sig1 | 0 = DO NOT ASSERT INTERRUPT SIGNAL 1.<br>1=ASSERT INTERRUPT SIGNAL 1 ACTIVE 1 FOR 2 CYCLES WHEN E1 EVENT OCCURS. |
| E0 S0-S3 Op | EACH 2-BIT FIELD SPECIFIES THE ACTION WHEN E1 EVENT OCCURS, ONE FIELD PER SEMAPHORE:<br>00 = NO CHANGE TO SEMAPHORE<br>01 = DECREMENT THE SEMAPHORE<br>10 = INCREMENT THE SEMAPHORE BY 1<br>11 = CLEAR SEMAPHORE TO ZERO |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | | | GRx (x=0,1,2,3,...) | | | | | | | | | | | | | | | | |

THE GENERAL (MESSAGE) REGISTERS GR0, GR1, GR2, AND GR3 ARE USED TO STORE ADDRESSES AND DATA FOR SENDING CONTROL MESSAGES TO SCB DEVICES. THEY MAY BE LOADED USING THE LIMGR INSTRUCTION, OR BY DIRECT WRITE BY AN SCB BUS MASTER.

FIG. 10B                      ~1082

| 31 30 | 29 28 27 26 25 24 | 23 22 | 21 20 | 19 18 17 16 | 15 14 13 12 11 10 09 08 | 07 06 05 04 03 02 01 00 |
|---|---|---|---|---|---|---|
| WAIT Opcode | | Sem ID | Sem Op | SCondition | NOT USED | Compare Val |

| | |
|---|---|
| | THE WAIT INSTRUCTION CAUSES INSTRUCTION FETCHING TO STOP WHILE THE SPECIFIED WAIT CONDITION IS TRUE. THE WAIT CONDITION IS SPECIFIED BY THE RELATIONSHIP BETWEEN A SPECIFIED SEMAPHORE (S0, S1, S2 OR S3), AND AN 8-BIT IMMEDIATE VALUE SPECIFIED IN THE INSTRUCTION. THE IMMEDIATE VALUE IS SUBTRACTED FROM THE SEMAPHORE AND THE FLAGS ARE SET TO ESTABLISH THEIR RELATIONSHIP. THE CONDITIONS ALLOW THE VALUES TO BE INTERPRETED AS EITHER SIGNED OR UNSIGNED NUMBERS. WHEN THE CONDITION SPECIFIED IS (OR BECOMES) FALSE, THE SPECIFIED SEMAPHORE IS UPDATED ACCORDING TO THE UPDATE CONTROL FIELD (BITS [21:20]). |
| SemID | SEMAPHORE ID. THIS SPECIFIES WHICH SEMAPHORE IS USED IN THE CONDITION COMPARISON.<br>00 = S0<br>01 = S1<br>10 = S2<br>11 = S3 |
| SCondition | SEMAPHORE CONDITION.<br>0000 = ALWAYS (WAIT UNTIL EXPLICIT COMMAND CAUSES A PROCESSING STATE CHANGE)<br>0001 = EQUAL<br>0010 = NOT EQUAL<br>0011 = HIGHER THAN<br>0100 = HIGHER THAN OR EQUAL<br>0101 = LOWER THAN<br>0110 = LOWER THAN OR EQUAL<br>0111 = CTUeot<br>1000 = STUeot<br>1001 = !ICTUeot (CTC NOT ZERO)<br>1010 = !ISTUeot (STC NOT ZERO)<br>1011 = GREATER THAN OR EQUAL<br>1100 = GREATER THAN<br>1101 = LESS THAN OR EQUAL<br>1110 = LESS THAN<br>1111 = RESERVED |
| SemOp | 00 = NO CHANGE TO SEMAPHORE WHEN WAIT CONDITION IS/BECOMES FALSE<br>01 = DECREMENT SEMAPHORE BY 1 WHEN WAIT CONDITION IS/BECOMES FALSE<br>10 = INCREMENT SEMAPHORE BY 1 WHEN THE WAIT CONDITION IS/BECOMES FALSE<br>11 = CLEAR TO ZERO WHEN THE WAIT CONDITION IS/BECOMES FALSE |
| Compare Val | IMMEDIATE 8-BIT VALUE WHICH IS SUBTRACTED FROM THE SPECIFIED SEMAPHORE VALUE TO OBTAIN THE COMPARISON CONDITIONS. |

FIG. 10C  ← 1083

| | |
|---|---|
| SYSTEM BUFFER IS 1K WORDS, SPLIT INTO 4 256 WORD BUFFERS. THE PRODUCER TASK IS GENERATING DATA INTO THESE BUFFERS IN A CIRCULAR FASHION. THE CONSUMER TASK (ON THE DSP) HAS ONLY A 256 WORD BUFFER, SPLIT INTO 4x64 WORD BLOCKS. EVERY TIME THE PRODUCER TASK FINISHES FILLING A BUFFER IT SIGNALS SEMAPHORE S1 BY WRITING TO THE APPROPRIATE COMMAND ADDRESS ON THE SCB. THE LIMEAR INSTRUCTION HAS CONFIGURED THE TRANSFER CONTROLLER TO RESTART THE STU ANYTIME IT IS IDLE AND S1 IS NON-ZERO, SINCE THE CTU HAS A NON-ZERO TRANSFER COUNT, IT ENTERS THE TRANSFER STATE AND 64 WORDS OF DATA ARE MOVED TO THE CONSUMER TASK BUFFER (THE MINIMUM OF 256 AND 64). | |
| linear STUrestart=s1, CTUrestart=s0, E0=STUeot, A0=assert{0}, E1=CTUeot, A1=(msgaddr=mbox1, msdata=GR0), | LIMEAR instruction: IF S1 NOT ZERO AT STU EOT THEN DECREMENT S1 AND RESTART STU. IF S0 NOT ZERO AR CTU EOT THEN DECREMENT S0 AND RESTART CTU. AT STU EOT ASSERT SIGNAL 0. AT CTU EOT SEND CONTENTS OF GR0 TO SCB ADDRESS "mbox1". |
| tsi.circular tc = 256, addr = 0x12000000 bufinit = 0, bufsize = 1024; | LOAD STU FOR INBOUND TRANSFER OF 256 WORDS WITHIN A CIRCULAR BUFFER OF 1K WORDS. |
| tsi.circular tc = 64, addr = 0x00200300, bufinit = 0, bufsize = 256; | LOAD CTU FOR INBOUND TRANSFER OF 64 WORDS WITHIN A CIRCULAR BUFFER OF 256 WORDS. |
| wait; | WAIT UNTIL A PROCESSOR WRITES A RESUME COMMAND. |

METHODS AND APPARATUS FOR PROVIDING DATA TRANSFER CONTROL

RELATED APPLICATIONS

The present application claims the benefit of U.S. Provisional Application Ser. No. 60/113,555 entitled "Methods and Apparatus Providing Transfer Control" and filed Dec. 23, 1998.

FIELD OF THE INVENTION

The present invention relates generally to improvements in array processing, and more particularly to advantageous techniques for providing improved data transfer control.

BACKGROUND OF THE INVENTION

Various prior art techniques exist for the transfer of data between system memories or between system memories and input/output (I/O) devices. FIG. 1 shows a conventional data processing system 100 comprising a host uniprocessor 110, processor local memory 120, I/O devices 130 and 140, a system memory 150 which is usually a larger memory store than the processor local memory and having longer access latency, and a direct memory access (DMA) controller 160.

The DMA controller 160 provides a means for transferring data between processor local memory and system memory or I/O devices concurrent with uniprocessor execution. DMA controllers are sometimes referred to as I/O processors or transfer processors in the literature. System performance is improved since the Host uniprocessor can perform computations while the DMA controller is transferring new input data to the processor local memory and transferring result data to output devices or the system memory. A data transfer is typically specified with the following minimum set of parameters: source address, destination address, and number of data elements to transfer. Addresses are interpreted by the system hardware and uniquely specify I/O devices or memory locations from which data must be read or to which data must be written. Sometimes additional parameters are provided such as element size. In addition, some means of initiating the data transfer are provided, and also provided is a means for the DMA controller to notify the host uniprocessor when the transfer is complete. In some conventional DMA controllers, transfer initiation may be carried out by programming specific registers within the DMA controller. Others are designed to fetch their own "transfer descriptors" which might be stored in one of the system memories. These descriptors contain the information required to carry out a specific transfer. In the latter case, the DMA controller is provided a starting address from which to fetch transfer descriptors and there must be some means for controlling the fetch operation. End-of-transfer (EOT) notification in conventional DMA controllers may take the form of signaling the host uniprocessor so that it generates an interrupt which may then be handled by an interrupt service routine. In other notification approaches, the DMA controller writes a notification value to a specified memory location which is accessible by the host uniprocessor. One of the limitations of conventional DMA controllers is that address generation capabilities for the data source and data destination are often constrained to be the same. For example, when only a source address, destination address and a transfer count are specified, the implied data access pattern is block-oriented, that is, a sequence of data words from contiguous addresses starting with the source address is copied to a sequence of contiguous addresses starting at the destination address.

Another limitation of conventional DMA controllers is the overhead required to manage the DMA controller in terms of transfer initiation, data flow control during a transfer, and handling EOT notification.

With the advent of the ManArray architecture, it has been recognized that it will be advantageous to have improved techniques for carrying out such functions tailored to this new architecture.

SUMMARY OF THE INVENTION

As described in detail below, the present invention addresses a variety of advantageous methods and apparatus for improved data transfer control within a data processing system. In particular, improved mechanisms are provided for initiating and controlling the sequence of data transfers; decoupling source and destination address generation through the use of independent specification of source and destination transfer descriptors (hereafter referred to as "DMA instructions" to distinguish them from a specific type of instruction called a "transfer instruction" which performs the data movement operation); executing multiple "source" transfer instructions for each "destination" transfer instruction, or multiple "destination" transfer instructions for each "source" transfer instruction; intra-transfer control of the flow of data (control that occurs while a transfer is in progress); EOT notification; and synchronizing of data flow with a compute processor and with one or more control processors through the use of SIGNAL and WAIT operations on semaphores.

Additionally, the present invention provides a DMA controller implemented as a multiprocessor consisting of multiple transfer controllers each supporting its own instruction thread. It allows cooperation between transfer controllers seen in the DMA-to-DMA method addressed further below. It addresses single-thread of control of dual transfer units or execution units. Execution control of a transfer instruction may advantageously be based on a flag in the instruction itself. Multiple instructions may execute in one unit while a single instruction executes in the other. Independent transfer counters for CTU and STU are provided. Conditional SIGNAL instructions which can send messages on control bus, interrupts or update semaphores are advantageously provided, as is a conditional WAIT instruction which is executed based on the state of a semaphore. When a wait condition becomes false, this semaphore is updated according to instruction. Further aspects include the use of transfer conditions in branch, SIGNAL and WAIT instructions (STUEOT, CTUEOT, notSTUEOT, notCTUEOT). Further, the use of semaphores is addressed as the basis for conditional execution. A generalization of these techniques allows dual-CTU or dual-STU transfer controllers. A dual-CTU transfer controller might be used to perform DMA transfers from one cluster's DMA bus to another cluster's DMA bus. Further, a restart capability based on RESTART commands, Load-transfer-count-and-restart commands, or a semaphore update from an SCB master is addressed.

These and other advantages of the present invention will be apparent from the drawings and the Detailed Description which follow.

BRIEF DESCRIPTION OF THE DRAWINGS

FIG. 4C illustrates transfer controller instruction types;

FIG. 4D shows an exemplary transfer program counter (TPC) register;

FIG. 4E shows an exemplary wait program counter (WAITPC) register;

FIG. 4F shows exemplary commands and addresses for a presently preferred embodiment of the present invention;

FIG. 5D illustrates conditions which may be used for branch instructions, and SIGNAL and WAIT instructions;

FIG 5E shows an exemplary format for semaphore registers for storing 8-bit semaphores;

FIG. 8B shows exemplary pseudo-code for a simple inbound block transfer with execute flag active;

FIG. 8C shows exemplary pseudo-code for a simple inbound block transfer with execute flag inactive;

FIG. 9B show an exemplary initial transfer count register;

FIG. 9C shows an exemplary current transfer count register;

FIG. 9D shows an exemplary data "gather" instruction sequence illustrating how a single STU instruction can operate with multiple CTU instructions from the same instruction thread;

FIG. 9E shows an example of a data "scatter" instruction sequence illustrating how a single CTU instruction can operate with multiple STU instructions from the same instruction thread;

FIG. 9F shows an exemplary format for an external signal register;

FIG. 9G illustrates an event action register 0;

FIG. 9H shows an exemplary format for a SIGNAL instruction;

FIG. 9I describes an event action register 1;

FIG. 9J shows an exemplary format for general registers;

FIG. 10B shows an exemplary format for a WAIT instruction; and

FIG. 10C shows an exemplary instruction sequence which allows independent flow control of data transfer by two host processors.

DETAILED DESCRIPTION

Figure 1:
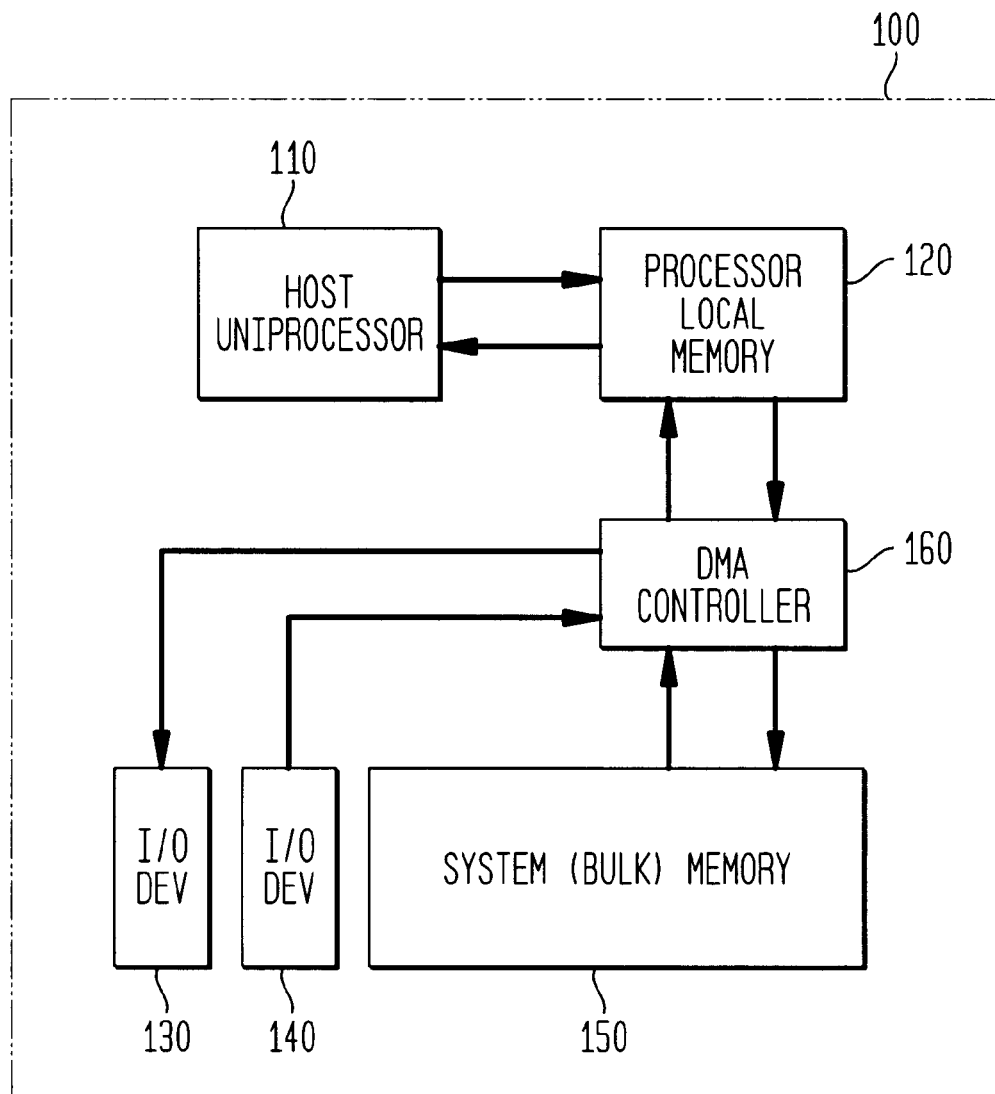
FIG. 1 Illustrates a conventional data processing system with a DMA controller to support data transfers concurrent with host processor computation.

Further details of a presently preferred ManArray core, architecture, and instructions for use in conjunction with the present invention are found in U.S. patent application Ser. No. 08/885,310 filed Jun. 30, 1997, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,558 filed Dec. 4, 1998, U.S. patent application Ser. No. 09/215,081 filed Dec. 18, 1998, U.S. patent application Ser. No. 09/228,374 filed Jan. 12, 1999 and entitled "Methods and Apparatus to Dynamically Reconfigure the Instruction Pipeline of an Indirect Very Long Instruction Word Scalable Processor", U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999 entitled "Methods and Apparatus for Abbreviated Instruction and Configurable Processor Architecture", U.S. patent application Ser. No. 09/432,705 filed Nov. 2, 1999 entitled "Methods and Apparatus for Improved Motion Estimation for Video Encoding", U.S. patent application Ser. No. 09/472,372 entitled "Methods and Apparatus for Providing Direct Memory Access Control" filed Dec. 23, 1999, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140,425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, and Provisional Application Ser. No. 60/171,911 entitled "Methods and Apparatus for DMA Loading of Very Long Instruction Word Memory" filed Dec. 23, 1999, respectively, all of which are assigned to the assignee of the present invention and incorporated by reference herein in their entirety.

The following definitions of terms are provided as background for the discussion of the invention which follows below:

A "transfer" refers to the movement of one or more units of data from a source device (either I/O or memory) to a destination device (I/O or memory).

A data "source" or "destination" refers to a device from which data may be read or to which data may be written which is characterized by a contiguous sequence of one or more addresses, each of which is associated with a data storage element of some unit size. For some data sources and destinations there is a many-to-one mapping of addresses to data element storage locations. For example, an I/O device may be accessed using one of many addresses in a range of addresses, yet for any of them it will perform the same read/write operation.

A "data access pattern" is a sequence of data source or destination addresses whose relationship to each other is periodic. For example, the sequence of addresses 0, 1, 2, 4, 5, 6, 8, 9, 10, . . . etc. is a data access pattern. If we look at the differences between successive addresses, we find: 1,1,2, 1,1,2, 1,1,2, . . . etc. Every three elements the pattern repeats.

"EOT" means "end-of-transfer" and refers to the state when a transfer execution unit (described in the following text) has completed its most recent transfer instruction by transferring the number of elements specified by the instruction's transfer count field.

As used herein, an "overrun at the source" of a transfer occurs when the producer of data over-writes data that the DMA controller has not yet read. An "overrun at the destination" of a transfer occurs when the DMA controller overwrites data that has not yet been processed by a consumer of data. An "underrun at the source" occurs when the DMA controller attempts to read data that has not yet been written by the producer, and an "underrun at the destination" occurs when the consumer task attempts to read and process data that the DMA controller has not yet written.

The term "host processor" as used in the following discussion refers to any processor or device that can write control commands and read status from the DMA controller and/or that can respond to DMA controller messages and signals. In general a host processor interacts with the DMA controller to control and synchronize the flow of data between devices and memories in the system in such a way as to avoid overrun and underrun conditions at the sources and destinations of data transfers.

Figure 2:
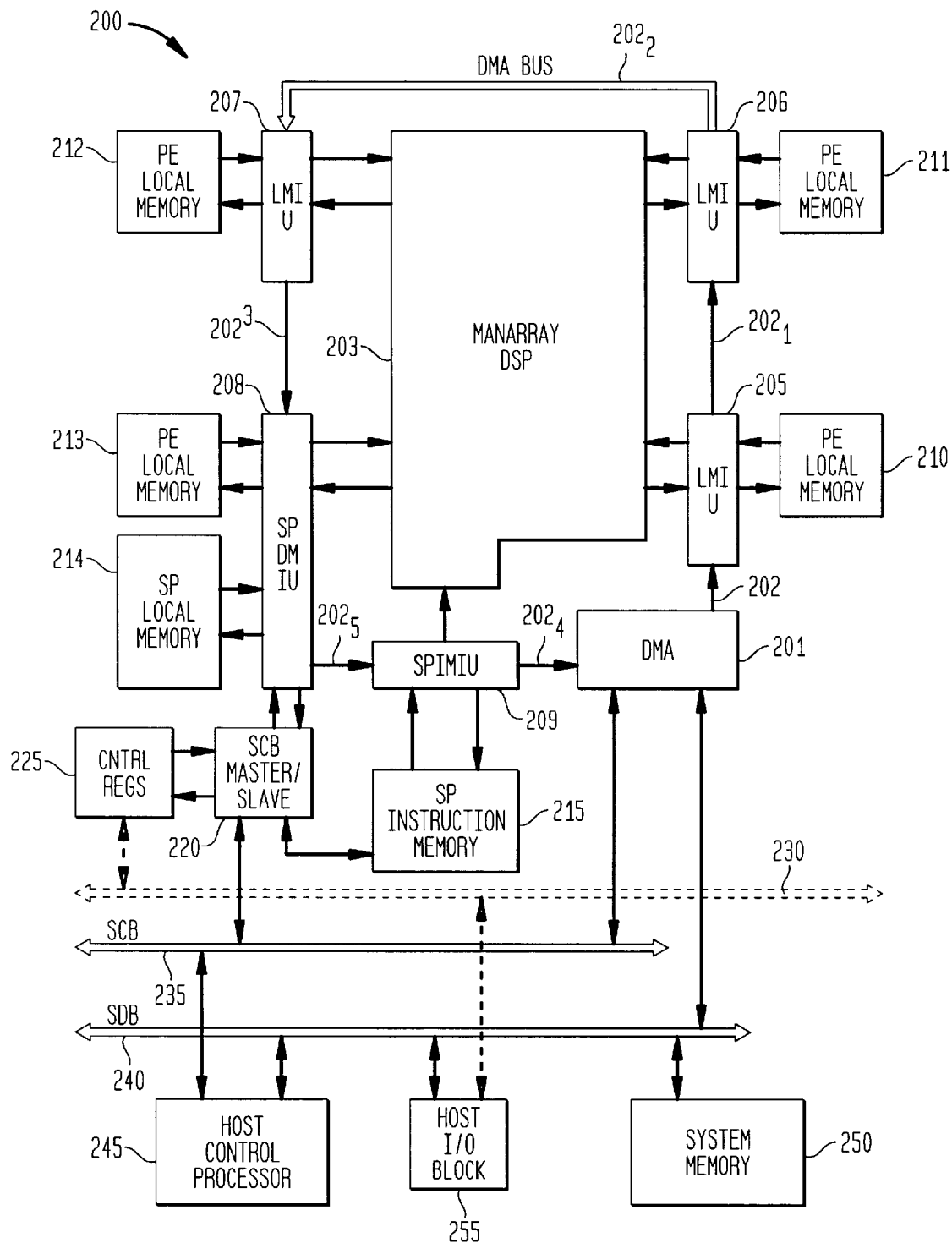
FIG. 2 is a ManArray DSP with a DMA controller in a system in accordance with the present invention.

FIG. 2 shows an exemplary system 200 illustrating the context in which a ManArray DMA controller 201, in accordance with the present invention, resides. The DMA controller 201 accesses processor local memories 210, 211, 212, 213, 214 and 215 via the DMA Bus 202, 202₁, 202₂, 202₃, 202₄, and 202₅ and the memory interface units 205, 206, 207, 208 and 209 to which it is connected. A ManArray DSP 203 also connects to its local memories 210–215 via memory interface units 205–209. Further details of a presently preferred DSP 203 are found in the above incorporated by reference applications.

In the representative system, the DMA controller also connects to two system busses, a system control bus (SCB) 235 and a system data bus (SDB) 240. The DMA controller is designed to transfer data between devices on the SDB 240, such as system memory 250 and the DSP 203 local memories 210–215. The SCB 235 is used by an SCB master such as DSP 203 or a host control processor (HCP) 245 to program the DMA controller 201 (read and write addresses and registers to initiate control operations and read status). The SCB 235 is also used by the DMA Controller 201 to send synchronization messages to other SCB bus slaves such as the DSP control registers 225 and the Host I/O block 255. Some registers in these slaves can be polled by the DSP and HCP to receive status from the DMA. Alternatively, DMA writes to some of these slave addresses can be programmed to cause interrupts to the DSP and/or HCP allowing DMA controller messages to be handled by interrupt service routines.

Figure 3:
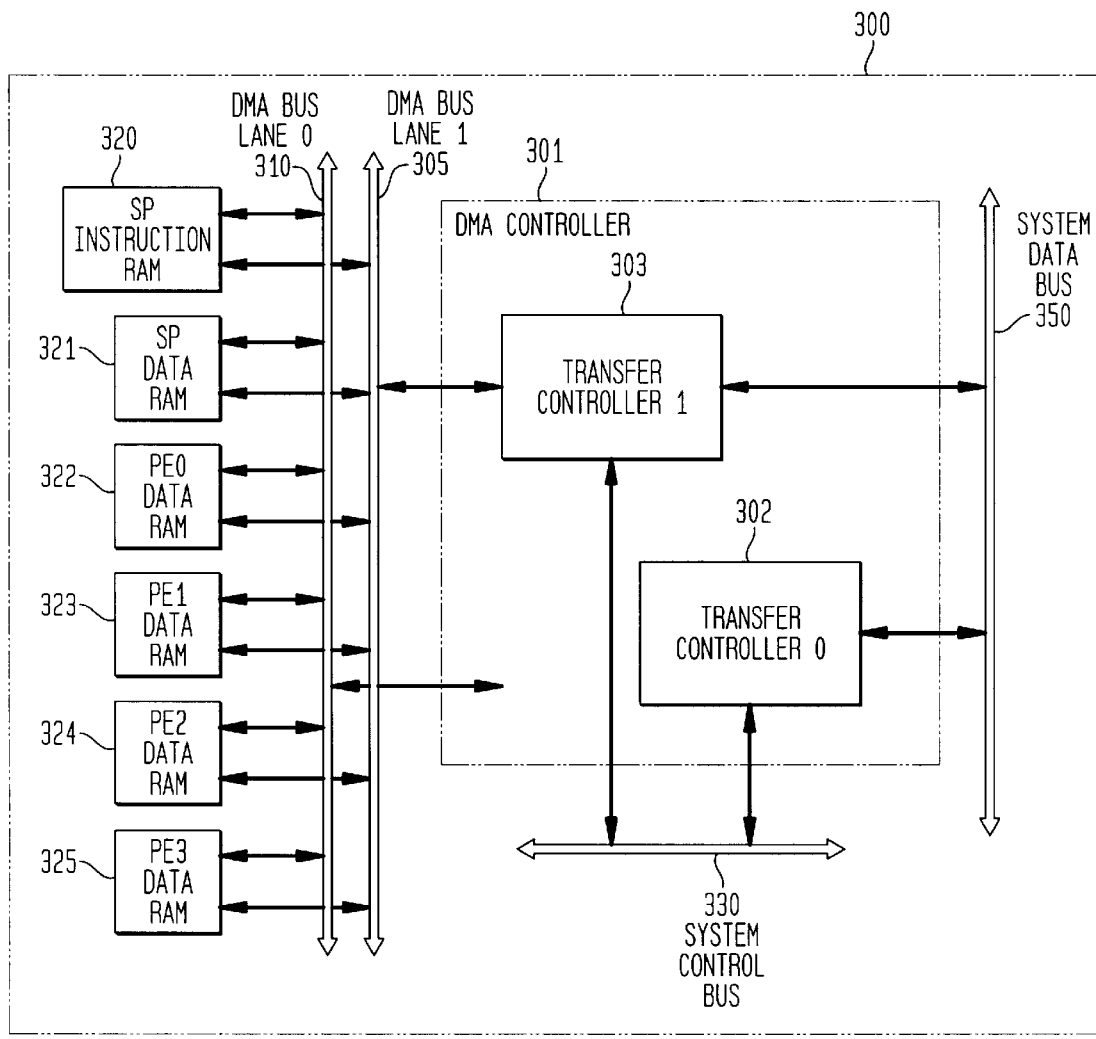
FIG 3. illustrates a DMA controller implemented as a multiprocessor, showing two transfer controllers, bus connections to a system memory, PE memories and a control bus.

FIG. 3 shows a system 300 which illustrates a DMA controller 301 which may suitably be a multiprocessor specialized to carry out data transfers utilizing one or more transfer controller units 302 and 303. Each transfer controller can operate as an independent processor or work together with other transfer controllers to carry out data transfers. The DMA busses 305 and 310 provide, in the presently preferred embodiment, independent data paths to local memories 320, 321, 322, 323, 324, 325 for each transfer controller 302 and 303. In addition, each transfer controller is connected to an SDB 350 and to an SCB 330. Each transfer controller operates as a bus master and a bus slave on both the SCB and SDB. As a bus slave on the SCB, a transfer controller may be accessed by other SCB bus masters in order to read its internal state or issue control commands. As a bus master on the SCB, a transfer controller can send synchronization messages to other SCB bus slaves. As a bus master on the SDB, a transfer controller performs data reads and writes from or to system memory or I/O devices which are bus slaves on the SDB. As a bus slave on the SDB, a transfer controller can cooperate with another SDB bus master in a "slave mode" allowing the bus master to read or write data directly from or to its data FIFOs (as discussed further below). It may be noted that the DMA Busses 305 and 310, the SDB 350 and the SCB 330 may be implemented in different ways, for example, with varying bus widths, protocols, or the like, consistent with the teachings of the current invention.

Figure 4A:
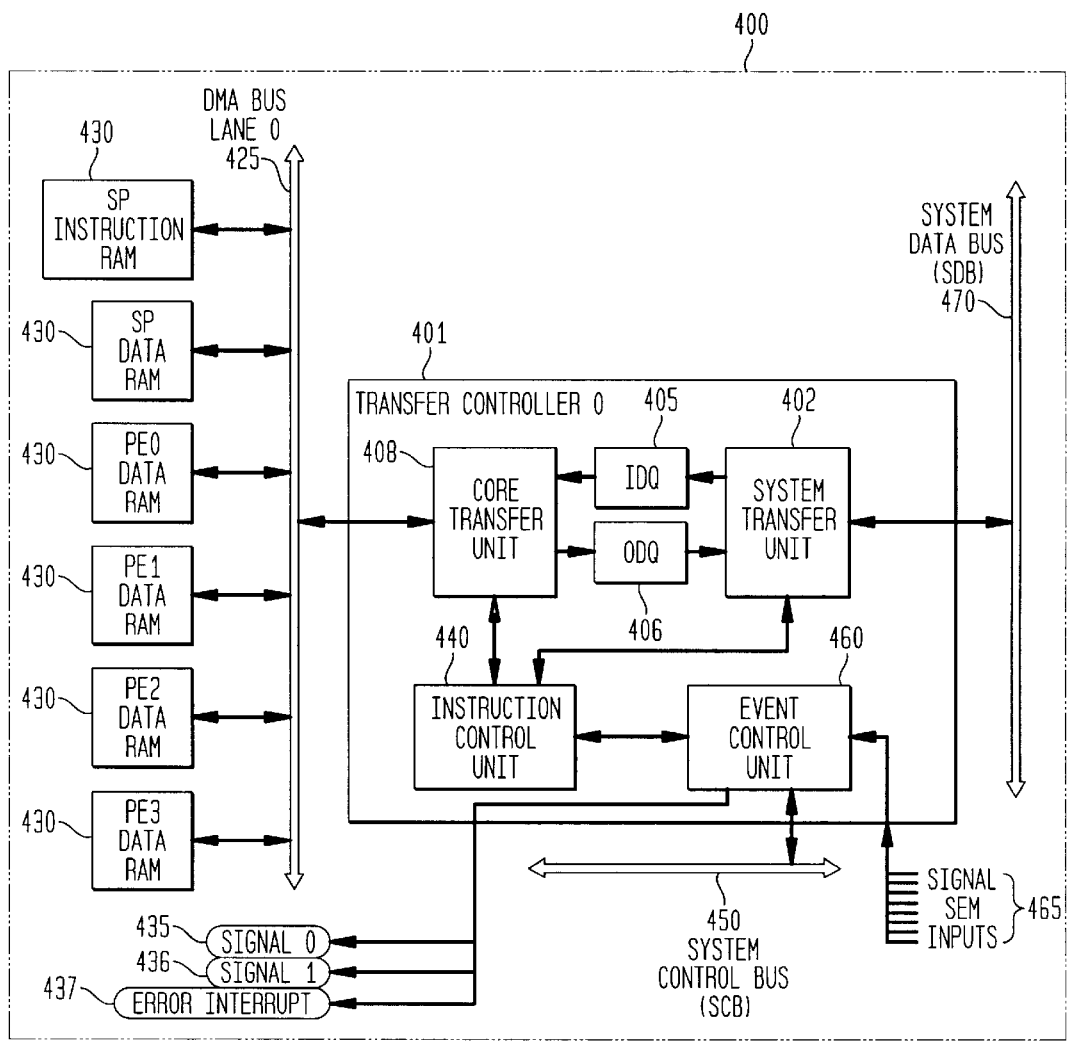
FIG. 4A shows a single transfer controller comprising 4 primary execution units, bus connections and FIFO buffers.

FIG. 4A shows a system 400 having a single transfer controller 401 comprising a set of execution units including an instruction control unit (ICU) 440, a system transfer unit (STU) 402, a core transfer unit (CTU) 408 and an event control unit (ECU) 460. An inbound data queue (IDQ) 405 is a data FIFO which is written with data from the SDB 470 under control of the STU 402. Data to be sent to core memories 430, or sent to the ICU 440 in the case of instruction fetches is read from the IDQ 405 under control of the CTU 408. An outbound data queue (ODQ) 406 is a data FIFO which is written with data from the DMA busses 425 under control of the CTU 408, to be sent to an SDB 470 device or memory under the control of the STU 402. The CTU 408 may also read DMA instructions from a memory attached to the DMA bus. These instructions are then forwarded to the ICU 440 for initial decode. The ECU 460 receives signal inputs from external devices 465, commands from the SCB 450 and instruction data from the ICU 440. It generates output signals 435, 436 and 437 which may be used to generate interrupts on host control processors within the system, and can act as a bus master on the SCB 450 to send synchronization messages to SCB bus slaves.

Transfer Sequence Control

Figure 4B:
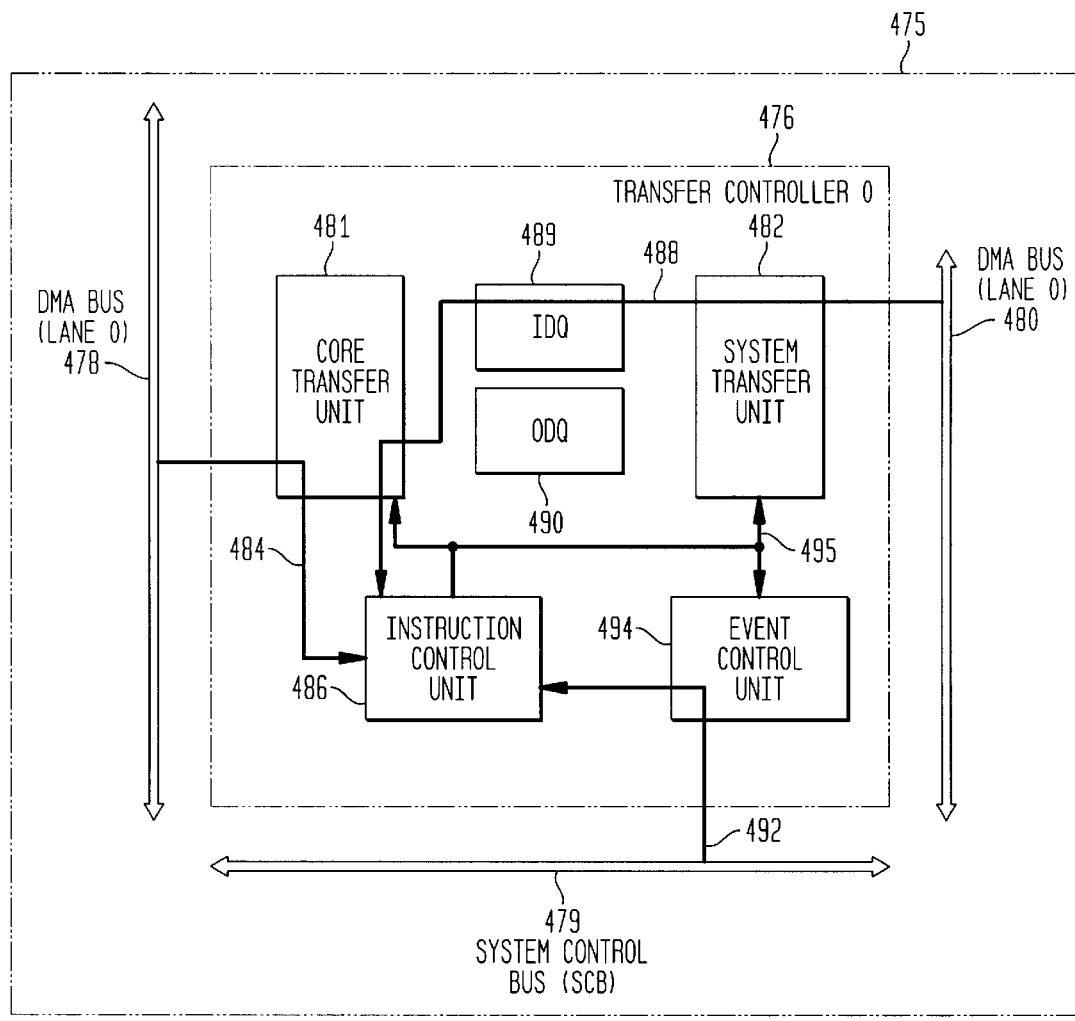
FIG. 4B shows paths over which DMA instructions may be fetched.

Each transfer controller within a ManArray DMA controller is designed to fetch its own stream of DMA instructions. DMA instructions may be fetched from memories located on any of the busses which are connected to the transfer controller: DMA busses, SDB or SCB. FIG. 4B shows a system 475 illustrating data paths from which instructions may be fetched. A transfer controller 476 can fetch DMA instructions from memories on the DMA Bus 478 and provide them on a path 484 to the ICU 486 under the control of the CTU 481. A second path 488 allows DMA instructions to be fetched from the SDB 480 under the control of the STU 482 through the IDQ 489 under the control of the CTU 481 and then forwarded to the ICU 486.

A third path allows instructions to be fetched from memories or devices on the SCB 479 on a data path 492 through the ECU 494 (which controls the SCB master interface) and then forwarded to the ICU 486. After receiving instructions, the ICU 486 decodes the first instruction word of each instruction, determines the number of remaining instruction words and forwards the control signals and additional instruction words to the execution units CTU 481, STU 482 and ECU 494 via an internal instruction bus 495. The ODQ 490 is not used for instruction fetch purposes.

DMA instructions are of five basic types: transfer; branch; load; synchronization; and state control. The branch, load, synchronization, and state control types of instructions are collectively referred to as "control instructions", and distinguished from the transfer instructions which actually perform data transfers. DMA instructions are typically of multi-word length and require a variable number of cycles to execute although several control instructions require only a single word to specify. DMA instructions will be described in greater detail below. FIG. 4C is a table 455 which shows a set of instruction types 456, list their operations 457 and briefly describes their functions 458 in a presently preferred embodiment of the invention. In table 455, "cc" indicates that instruction execution depends on a condition specified in the instruction.

Two registers are used to support the fetching of instructions: a transfer program counter (TPC) register 459 of FIG. 4D, and a wait program counter (WAITPC) 462 of FIG. 4E. In a preferred embodiment, these registers have a sufficient number of bits (e.g. 32) to address all memories which may contain instructions. The TPC contains the address of the next instruction word to be fetched and decoded. After fetching a complete instruction and updating the TPC, the control logic compares the value of TPC with the value stored in WAITPC. If TPC and WAITPC are equal, then the fetching and decoding of instructions is suspended. In the preferred embodiment, a block of instruction words is fetched into a local cache from which they are read and decoded, but this is only one of many methods to decrease instruction fetch latency for subsequent instructions. At powerup or after a reset command or signal is received by a transfer controller, TPC and WAITPC are set to the same value. A command address is provided called the INITPC address 463 FIG. 4F which, when written with a DMA instruction address value, updates both the TPC and WAITPC registers with the value, allowing an instruction start address to be specified without initiating the fetching of instructions. Writing a new value to either TPC or WAITPC and thereby making the two different will cause instruction fetching to proceed.

Figure 5A:
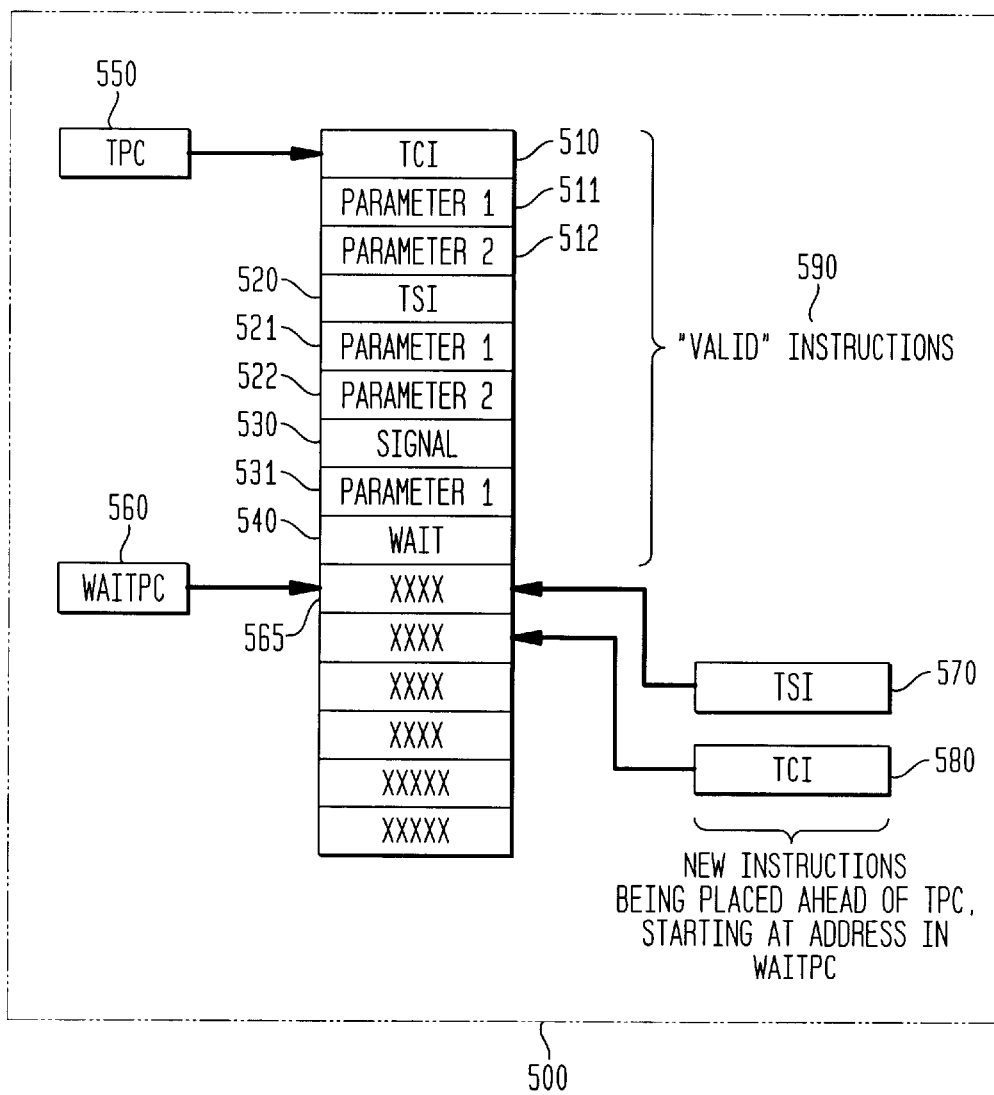
FIG. 5A shows how TPC and WAITPC register can be used to control instruction fetching in accordance with the present invention.

FIG. 5A shows a sequence of DMA instructions 500. The contents of TPC 550 address the first instruction 510 in the sequence, which has multiple words 511 and 512 as parameters. The address in WAITPC register 560 points to the word 565 immediately following the last valid instruction word 540. After fetching, decoding and executing the remaining instructions up to the address in WAITPC (520, 521, 522, 530, 531, 540), TPC 550 will become equal to WAITPC and instruction fetching and decode will suspend. Instructions may be added to memory locations following the address in WAITPC as shown with the TSI 570 and TCI 580 instructions. In order to resume fetching instructions, either the TPC or the WAITPC register must be changed so that TPC no longer matches WAITPC. In a presently preferred embodiment, WAITPC must contain the address of the first word of an instruction for it to suspend fetching when a match occurs since the comparison only takes place prior to starting the fetch and decode of a new instruction. This choice is implementation specific and is made to simplify the logic of multi-word instruction decode. Also, there are some instructions which, by executing, cause fetching to be suspended, such as the WAIT instruction 540 in FIG. 5A.

Mechanism for Exclusive Access to WAITPC

If there are multiple host processors which wish to update or add instructions to the DMA instruction list, then it is necessary that some form of mutual exclusive access to the WAITPC register be maintained. A hardware support means for this mutual exclusion is provided through the use of a LOCK register 575 illustrated in FIG. 5B, and a set of LOCKID read-only addresses 464 of FIG. 4F which are recognized by the transfer controller's SCB slave logic. The 8 read-addresses, or LOCKID addresses 464, are set aside in the transfer controller's command/address space and are visible to SCB bus masters. They are used in the following manner:

Each host processor which needs to update the transfer controller's DMA instruction list is assigned one of the 8 unique LOCKID addresses.

When a host processor wishes to add instructions ahead of the current WAITPC value, it reads from its own LOCKID address. The transfer controller returns the value of the "locked" bit 576 of the LOCK register 575 of FIG. 5B.

If the value returned is 0, then no other host processor currently owns the lock. The processor becomes the new owner of the "lock" on the WAITPC register and may now append instructions freely, starting at the current WAITPC address. When a host processor becomes owner of the lock, the "locked" bit of the LOCK register is set to "1", and the lower 3 bits of the host processor's LOCKID address are written to bits[2-0] of the LOCK register 575.

If the value returned is 1 then another host processor currently owns the lock on WAITPC, and the requesting host processor must continue polling its LOCKID address until a value of 0 is returned, indicating that it has received ownership of the lock on WAITPC.

When a host processor which owns the lock has finished updating the instruction list, it writes a new value to WAITPC pointing to the next instruction location immediately after the last instruction added. The act of writing to the WAITPC clears the "locked" flag in the LOCK register, making it available to another processor.

The hardware does not prevent write access to the WAITPC register, but only provides a semaphore mechanism to facilitate software scheduling of the WAITPC (i.e. DMA instruction list) resource.

Figure 5B:
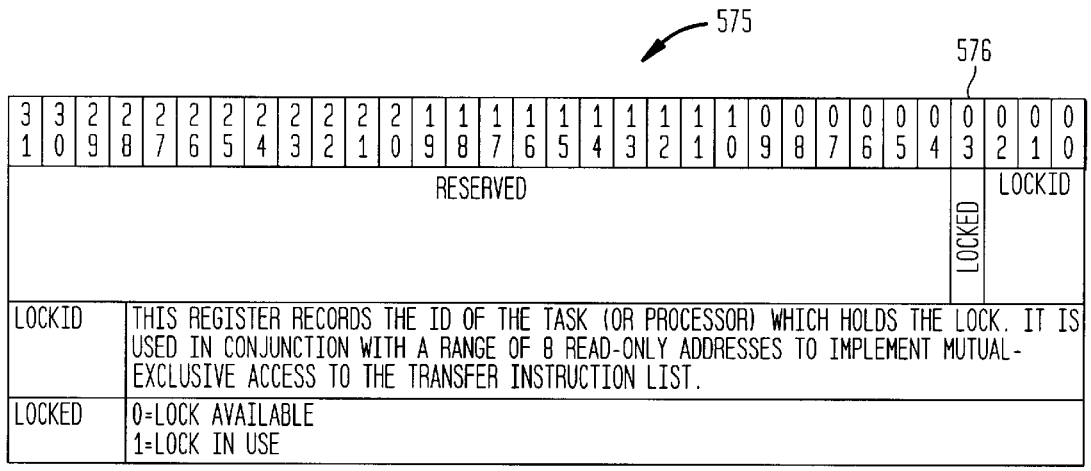
FIG. 5B shows an exemplary LOCK register used for mutual exclusive access to the WAITPC register.

The LOCK register is a read-only register that returns the identity of the last (or current) owner of the lock and the status of the "locked" bit 576 of FIG. 5B.

It will be evident that the choice of the number of lock addresses to be assigned is arbitrary and the method and apparatus can be extended or reduced to support more or fewer SCB masters.

Branch Instructions

Figure 5C:
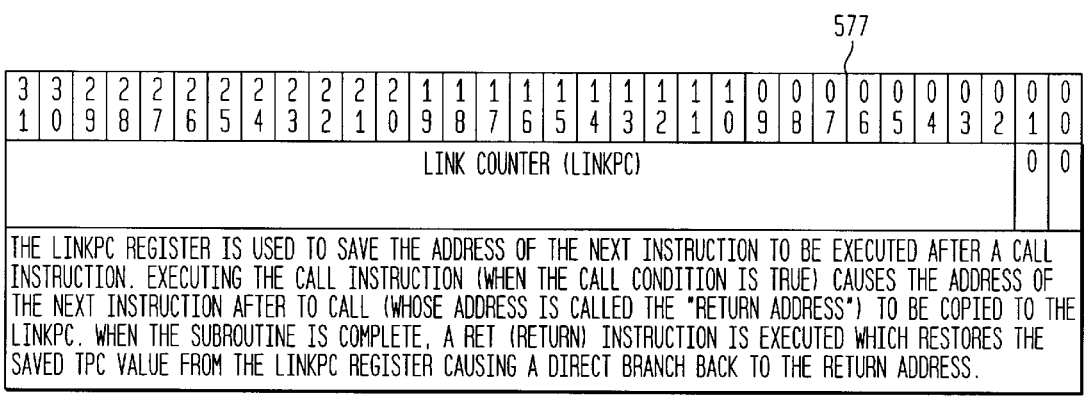
FIG. 5C shows an exemplary link program counter (LINKPC) register.

Instruction sequencing can also be controlled by executing branch-type instructions. The transfer controller supports five types of branch instructions 439 as shown in FIG. 4C: jump-relative, jump-absolute, call-relative, call-absolute, and return. Jump-relative loads the TPC with the sum of TPC and an immediate offset value contained in the instruction. Jump-absolute loads TPC with an immediate value contained in the instruction. Call-relative operates the same as jump-relative, except that before loading TPC with the new value, the old value which points to the address immediately following the CALL instruction is copied to a link counter register 577 called LINKPC shown in FIG. 5C. Call-absolute operates the same as jump-absolute, except a copy of the old TPC is stored in LINKPC prior to updating TPC. The return instruction RET copies the value of LINKPC to TPC. Instruction fetch then resumes from the updated TPC address as long as TPC is not equal to WAITPC.

All branch instructions are conditional. FIG. 5D shows a list 578 of the condition specifiers which may be tested to determine whether a branch should be taken or not. One of the condition specifiers is "Always", meaning that the branch is always taken making it unconditional. Condition specifiers are both arithmetic (Equal, NotEqual, Higher, HigherOrEqual, Lower, LowerOrEqual, GreaterOrEqual, Greater, LessOrEqual, Less) and non-arithmetic (CTUeot, STUeot, NotCTUeot, NotSTUeot, Always) as shown in FIG. 5D. In order to determine the truth value of an arithmetic condition a semaphore register (such as one of registers S0, S1, S2 or S3 579 shown in FIG. 5E which illustrates the presently preferred embodiment) specified in the instruction is compared with zero. If the relationship between the semaphore value and zero is the same as that specified by the condition specifier (e.g. "Greater", or "Equal"), then the branch condition is TRUE. Otherwise, it is FALSE. If the condition is TRUE, the branch is taken, and an optional update to the semaphore is made (increment, decrement, clear to zero, or no change). If the branch is FALSE, the branch instruction is treated as an NOP ("no-operation"). It is ignored and no update to the semaphore is performed.

For example, the instruction, jmp.GT S0 —, newlocation, compares semaphore register S0 to zero. If it is greater than zero ("GT"), then the branch to "newlocation" occurs (the address of "newlocation" is loaded into TPC and the next instruction is fetched from there). In addition, the semaphore S0 is decremented by 1 as a side-effect ( "S0 —"). If the register S0 is less than or equal to zero (S0 is treated as a signed two's complement number), then the branch is not taken and no decrement of S0 occurs.

Four of the five non-arithmetic conditions (CTUeot, STUeot, NotCTUeot and NotSTUeot) allow branches to be taken or not, depending on transfer unit status. These conditions are useful for controlling the instruction sequence when instructions are fetched after a transfer has completed. Since either the STU or the CTU can finish processing an instruction before the other if their transfer counts differ, it is sometimes useful to conditionally branch based on which unit completes first.

Instruction Decode, Dispatch and Execute

Referring again to system 400 of FIG. 4A, transfer-type instructions are dispatched by the ICU 440 for further decode execution by the STU 402 and the CTU 408. Transfer instructions have the property that they are fetched and decoded sequentially, in order to load transfer parameters into the appropriate execution unit, but are executed concurrently. The control mechanism for initiating execution of transfer instructions is a flag bit contained in the instruction itself, and is described below.

A "transfer-system-inbound" or TSI instruction moves data from the SDB 470 to the IDQ 405 and is executed by the STU. A "transfer-core-inbound" or TCI instruction moves data from the IDQ 405 to the DMA Bus 425 and is executed by the CTU. A "transfer-core-outbound" or TCO instruction moves data from the DMA Bus 425 to the ODQ 406 and is executed by the CTU. A "transfer-system-outbound" or TSO instruction moves data from the ODQ 406 to the SDB 470 and is executed by the STU. Two transfer instructions are required to move data between an SDB system memory and one or more SP or PE local memories on the DMA Bus, and both instructions are executed concurrently: a (TSI, TCI) pair or a (TSO, TCO) pair. The address parameter of STU transfer instructions (TSI and TSO) refers to addresses on the SDB while the address parameter of CTU transfer instructions refers to addresses on the DMA Bus to PE and SP local memories.

Figure 6:
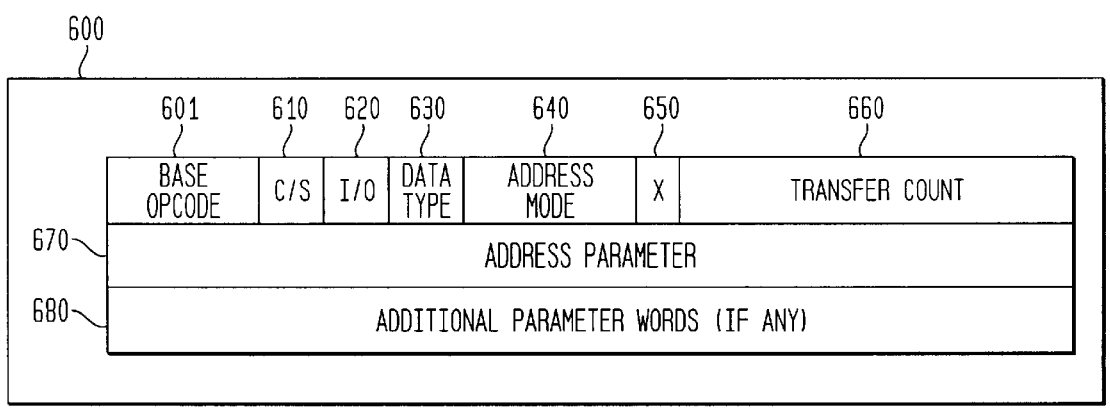
FIG. 6 shows a general format of a transfer instruction type.

FIG. 6 shows an exemplary instruction format 600 for transfer instructions. A base opcode field 601 indicates that the instruction is of the transfer type. A C/S field 610 indicates the transfer unit (CTU or STU) and an I/O field 620 indicates whether the transfer direction is inbound or outbound. A data type field 630 indicates the size of each element transferred and an address mode 640 refers to the data access pattern which must be generated by the transfer unit. Transfer count 660 indicates the number of data elements of size "data type" which are to be transferred to or from the target memory/device before EOT occurs for that unit. An address parameter 670 specifies the starting address for the transfer, and other parameters 680 follow the address word of the instruction (some addressing modes require additional parameters). The "X" (execute) field 650 is a field which, when set to "1" indicates a "start transfer" event, that is, the transfer should start immediately after loading the transfer instruction. When the "X" field is "0", then the parameters are loaded into the specified unit, but instruction fetch/decode continues until a "start transfer" event occurs.

Figure 7:
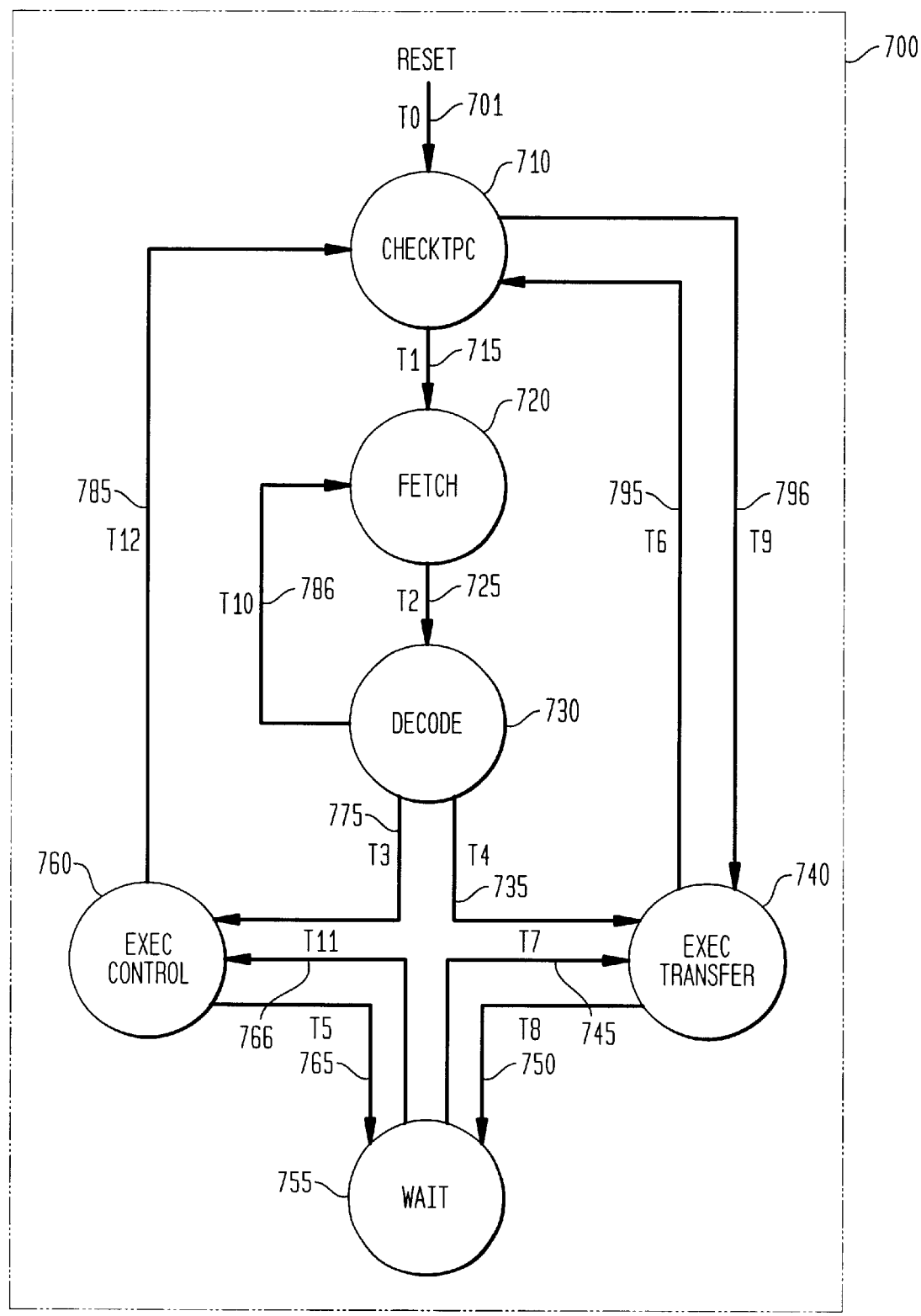
FIG. 7 shows a logical view of a top-level transfer controller state machine for use in conjunction with the present invention.

FIG. 7 shows global states 700 within which the transfer controller operates. A transfer controller RESET event, such as powerup or receiving a RESET command or signal, causes a logic transition TQ 701 to advance to a CHECK-TPC state 710 in which the TPC is compared with WAITPC. Since TPC is equal to WAITPC after reset, no instruction fetching occurs. When WAITPC or TPC is updated so that TPC is not equal to WAITPC, transition T1 715 occurs, placing the transfer controller in a FETCH state 720. After an instruction word is fetched, T2 transition 725 to DECODE state 730 occurs. If the instruction is multiple words, then transitions Tl0 786 to FETCH 720 is followed by transitions T2 725 to DECODE 730 occur until all instruction words have been processed. With each word fetched, the TPC is incremented by one instruction word address. If the instruction is a control type instruction, transition T3 775 to EXEC CONTROL 760 occurs and the instruction action is performed, followed by a transition T12 785 back to CHECKTPC 710.

Executing a WAIT type instruction (with a TRUE condition—discussed further below) causes the transfer controller to take transition T5 765 to WAIT state 755. When the wait condition becomes FALSE, transition T11 766 returning to EXEC CONTROL 760 occurs to complete the WAIT instruction execution, followed by a transition T12 785 back to CHECKTPC 710. When in the DECODE state 730 and a transfer type instruction has been decoded, and a start transfer event is detected ("X" field in the instruction is "1") the transition T4 735 to EXEC TRANSFER 740 occurs. The transfer continues until an EOT (end-of-transfer) condition is detected, at which time a transition T6 795 back to CHECKTPC 710 occurs. Transitions T7 745 and T9 796 occur when a "restart transfer" event is detected in the WAIT state 755 and CHECKTPC state 710 respectively. When a restart event is detected while in the WAIT state and transition T7 occurs to the EXEC TRANSFER 740 state, when the transfer is complete (either STU or CTU reaches EOT), then transition T8 back to the WAIT 755 state occurs. Restart transfer events are further described below.

While the transfer controller operates in one of the global states 700 of FIG. 7, FIG. 8 shows the sub-states 800 in which the transfer units (STU and CTU) operate. The transfer units are driven by the ICU instruction dispatcher 440 and by event monitoring logic in the ECU 460 of FIG. 4A. After a RESET event, transition T0 810 places the transfer unit into the INACTIVE state 815. In this state, neither a "start transfer event" nor a "restart transfer event" can cause the transfer unit to begin a transfer sequence since transfer parameters are considered invalid. When a transfer unit detects new transfer parameters are being loaded, transition T1 820 takes the unit to the DECODE state 825. After loading all transfer instruction parameters, if the execute "X" flag of the instruction is not "1", then transition T2 830 takes the transfer unit to the IDLE state 840. If the "X" flag is "1" ("start transfer"), then transition T5 855 places the unit into the TRANSFER state 850. When the unit detects its EOT condition, transition T4 835 places the unit back into the IDLE state 840. If a "restart transfer" event is detected while in the IDLE state 840, transition T3 845 places the unit back into the TRANSFER state 850. If a CLEAR command from an SCB bus master is received in any state, the transfer units parameters are invalidated and the logic makes the transition T7 860 to the INACTIVE state 815.

As addressed previously, for most transfers, two transfer instructions are required to move data from a source memory or device to a destination memory or device, one executing in the CTU and one in the STU. FIG. 8B shows an instruction sequence 875 to perform a simple block transfer. The ".x" on the tci.block.x instruction indicates immediate initiation of the transfer after decoding both instructions. FIG. 8C shows an instruction sequence 885 for a second instruction is the same as sequence 875 only without the ".x" (execute) directive. In this case, the transfer is not started, but the following WAIT instruction is fetched and executed. In other words, the logic waits for an external "start event" to occur, either a RESTART command or a RESUME which will cause instruction fetching to continue. These commands are shown in FIG. 4F. Note that in this example, both transfer counts are the same. One of the features of the present invention is that the STU and CTU operate with independent transfer counters, making it possible to execute multiple transfer instructions in one transfer unit, while the other is processing a single transfer instruction. This result is achieved by specifying a sequence of instructions in which the transfer counts are different in each transfer unit.

Figure 9A:
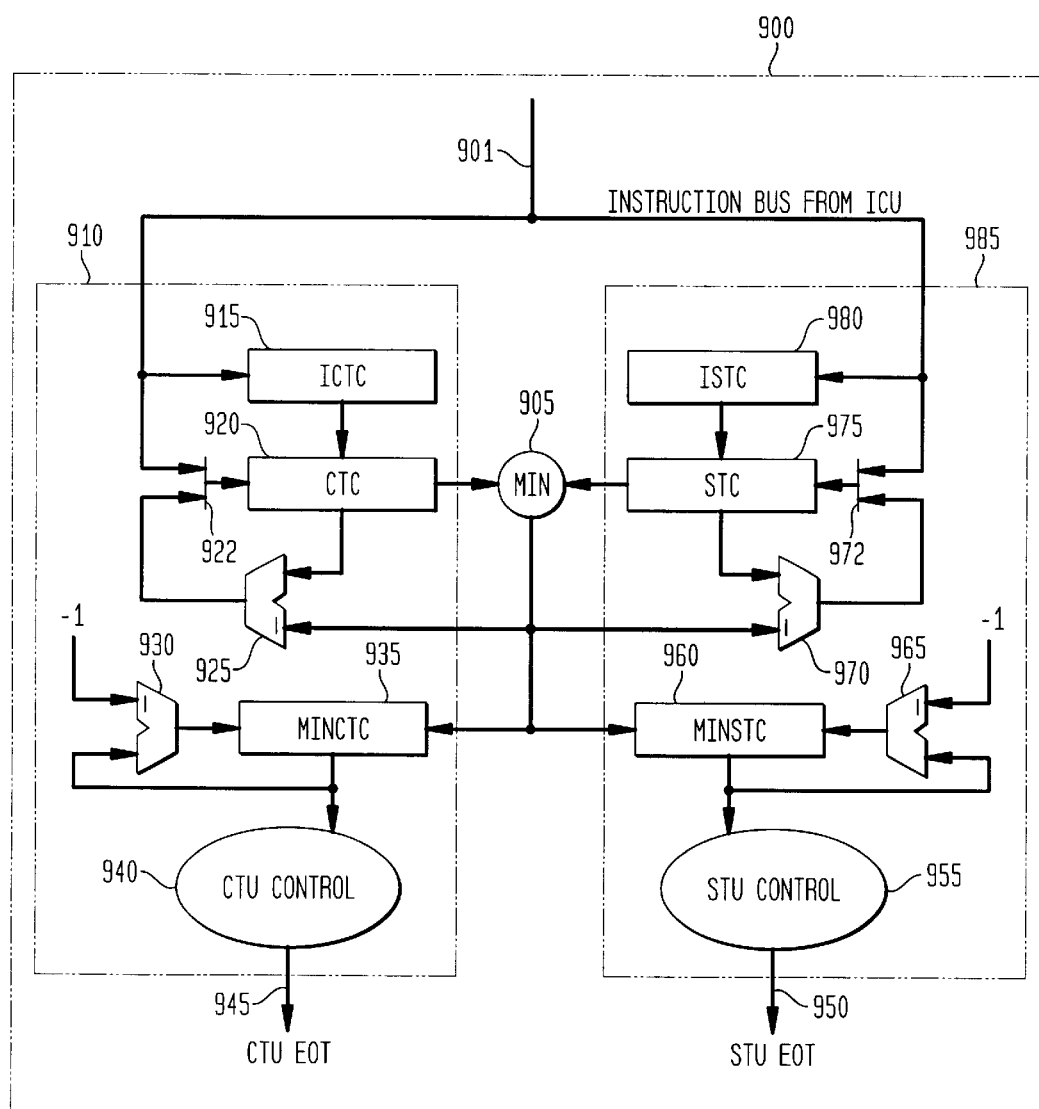
FIG. 9A shows separate transfer counters and data paths for STU and CTU control logic.

FIG. 9A illustrates a separate transfer counter logic 900. Blocks 985 and 910 are parts of the STU and CTU logic respectively. CTU control logic 940 controls the updates of counters 915, 920, 935, and generation of a CTU EOT 945. STU control logic 955 controls the updates of counters 960, 975, 980, and generation of an STU EOT 950. An instruction bus 901 feeds both transfer units. When one of the transfer units is decoding a transfer instruction as specified by the C/S field 610 of the transfer instruction 600 of FIG. 6, the transfer count specified in the instruction is copied to its initial transfer count register, ISTC 980 or ICTC 915 and current transfer count register STC 975 or CTC 920 through multiplexers 972 and 922, respectively. The ISTC and ICTC registers retain the initial transfer count as loaded by the last transfer instruction, or by a direct command from an SCB bus master. When a transfer is started, either by a "start transfer" indicator in a transfer instruction, or by another restart event, a minimum transfer count value is calculated by minimum calculator 905, as the minimum of STC 975 and CTC 920. This value becomes the minimum count value stored by counters MinSTC 960 and MinCTC 935, and is also subtracted by subtractors 970 and 925 from both current transfer count values STC 975 and CTC 920 and then stored back in the current transfer count registers through multiplexers 972 and 922. The MinSTC and MinCTC counters 965 and 930 are decremented once for each data element transferred by their respective transfer units. The minimum transfer count value is used to determine when an EOT condition has occurred, either CTU EOT 945 or STU EOT 950. Since the minimum of the two current transfer count values is always used as the common transfer count, at least one of the transfer units will transfer its entire count of data elements and reach an EOT condition, 945 or 950. When either transfer unit reaches an EOT condition, instruction fetch and decode is reenabled in the ICU, and the other unit retains its last count value in its current transfer count register, and its last access address so that if restarted, it will continue accessing data from where it left off. In the presently preferred embodiment, the initial transfer count values ISTC and ICTC 980 and 915 may be read from a single register 986, ITCNT illustrated in FIG. 9B, and the current transfer count values may also be read from a single register 987, TCNT illustrated in FIG. 9C.

FIG. 9D shows a DMA instruction sequence 988 that performs a single outbound STU transfer (from ODQ to system memory) while processing four outbound CTU transfer instructions (from PE local memories to the ODQ). Each of the four TCO transfers specifies an immediate execute. This has the effect of restarting the STU from where it left off (in terms of its transfer count and last address accessed). The TSO (STU instruction) will have the effect of merging the data read by each of the four CTU transfer instructions into a single block in System memory.

FIG. 9E shows a similar DMA instruction sequence 989, only now the multiple TSO instructions perform a scatter of the data read by the single TCO instruction. It will be recognized that instructions 988 and 989 are only examples to show the flexibility of the present control method.

Synchronizing A Host Processor (or Processors) with Data Transfer

In many applications, synchronization of host processing with data transfer requires the following:

The transfer engine cannot be allowed to overtake the producer of data (underrun), and the data must be transferred before the producer overwrites a region with valid but un-transferred data with new data (overrun). In other words, underrun and overrun conditions at the source must be avoided.

Data transferred to the destination cannot overwrite unprocessed data (overrun), and the consumer of data can't be allowed to process invalid data (i.e. a region of data that has not been updated by the transfer engine). In other words, overrun and underrun at the destination must be avoided.

The control necessary to prevent underflow and overflow at the source and destination respectively should incur minimal overhead in the source and destination processors, and to a lesser extent the transfer engine whose function is to hide transfer latency.

There are several synchronization mechanisms available which allow these requirements to be met for each transfer controller. These mechanisms will be described by the direction of control flow, either host-processor-to-transfer controller or transfer controller-to-host processor where, for example, host-processor may refer to either the DSP 203 or host control processor 245 of FIG. 2 or both.

Once a transfer has been started there must be some means for the host processor to know when the transfer has completed or reached some "point of interest". These "points of interest" correspond to internal transfer conditions which may be checked and which may then be used to generate signaling actions back to the host processor or processors. Each transfer controller tracks the following internal conditions:

When TPC=WAITPC

When CTU has transferred the requested number of elements (CTU EOT)

When STU has transferred the requested number of elements (STU EOT)

When both CTU and STU have transferred the requested number of elements (CTU EOT AND STU EOT)

The "TPC=WAITPC" condition is checked during the CHECKTPC state 710 of FIG. 7 and causes fetching to pause while the condition is true. As previously stated, while in the EXEC TRANSFER state 740 a transfer controller uses two transfer counters, the system transfer count (STC) and the core transfer count (CTC). The STC contains the number of data elements to be transferred from (inbound) or to (outbound) the SDB. The CTC contains the number of data elements to be transferred from (outbound) or to (inbound) the DMA Bus.

The main criteria for determining when an end-of-transfer (EOT) condition has occurred is that one of the transfer counters has reached zero AND all data in the transfer path has been flushed to the destination (FIFOs are empty, etc.). When an EOT condition is detected the transfer controller transitions to the CHECKTPC state 710, and proceeds to fetch and decode more instructions if TPC and WAITPC are not equal. The manner in which STC and CTC are decremented and EOT is determined depends on whether the transfer is inbound or outbound.

For outbound transfers, an EOT condition occurs when (STC reaches zero OR CTC reaches zero) AND the ODQ FIFO is empty AND the SDB bus master is idle.

For inbound transfers, an EOT condition occurs when (STC reaches zero OR CTC reaches zero) AND the IDQ FIFO is empty AND the all data has been written to the DSP local memory.

These conditions ensure that when the transfer controller signals that a transfer is complete, the data is actually valid for a host processor, and data coherence is maintained.

Host processors can communicate with the transfer controller using either commands (writes to special addresses), register updates (writes with specific data), or discrete signals (usually from an I/O block). In addition, host processors can update the transfer controllers instruction flow by using the WAITPC register to break transfer programs into blocks of transfers. Multiple hosts can use the same DMA transfer controller, updating its instruction stream by using the LOCKID register and associated command addresses to implement mutually exclusive access to the WAITPC. Semaphore commands may be used to both signal and wait on a semaphore, see command INCS0 491 in table 496 of exemplary commands, associated addresses and read/write characteristics of FIG. 4F, for example. Particular access addresses are used to allow these operations to be performed in one bus transfer (either a read or a write). Specific register updates (such as writing to the transfer count registers) can be used to restart a transfer. A list of operations that a host processor can perform follows:

Reset transfer controller;

Write to the INITPC register to place a new address into both TPC and WAITPC;

Write to the TPC register;

Execute a "wait" operation on a semaphore (read SWAIT or UWAIT address);

Execute a "signal" operation on a semaphore (write the INCSx or DECSx address, or assert one of the SIGNALSEMx input wires);

Read from the LOCKx register (to acquire a software lock for accessing WAITPC);

Write to the WAITPC to allow instruction processing to advance;

Write to CTC to update transfer count with optional auto-restart;

Write to STC to update transfer count with optional auto-restart; or

Suspend, resume, restart transfers.

The SIGNALSEMx wires provide a set of input signal 465 shown in FIG. 4a to the transfer controller. These signals are associated with a transfer controller's semaphore registers 579 shown in FIG. 5E. The EXTSIG register 990 shown in FIG. 9F is used to configure which of the input signals is used to update each semaphore, and to provide an enable bit. A one-cycle pulse on a selected SIGNALSEM signal will cause the associated semaphore register semaphore to be incremented by 1. If this signal is asserted on exactly the same cycle that a transfer controller is executing a WAIT operation on the same semaphore, then the semaphore is not updated by either operation, and both operations complete as if their respective updates occurred sequentially.

An exemplary table 496 of commands and addresses for a presently preferred embodiment is shown in FIG. 4F. Two of these commands will be discussed further, CLEAR 497 and RESTART 498. The CLEAR command may be targeted at both transfer units (CLEAR) or either transfer unit individually (CLEARSTU, CLEARCTU), and causes a transfer unit to invalidate its current transfer parameters and enter an INACTIVE state 815 illustrated in FIG. 8A. When a transfer unit is in the INACTIVE state, the only means for getting it back into operation is to fetch a transfer instruction targeted for that unit. The STU has special purpose behavior in this regard, however. When the STU is issued a CLEARSTU command and placed in the INACTIVE state, then it becomes a visible slave on the SDB. This approach means that any data placed into the IDQ by an SDB bus master may be distributed to DSP local memories by a CTU transfer instruction, and any data placed into the ODQ by the CTU can be read from the ODQ by accessing the correct slave address range for that transfer controller. This behavior is useful for implementing DMA-to-DMA transfers, as will be discussed further below.

The RESTART command 498 may also be targeted at one or both transfer units (RESTART, RESTARTCTU, RESTARTSTU). When a restart command is received by a particular unit, if the unit is not in the INACTIVE state 815 shown in FIG. 8A, then the following events occur:

(1) If the transfer count is non-zero, then the transfer unit is restarted beginning from where it left off, using its current transfer count.

(2) If the transfer count is zero, then the current transfer count is reloaded from the initial transfer count, and the transfer is continued from the address at which it left off.

(3) The unit that is not the target of the restart operation will continue transferring from where it left off, if its transfer count is nonzero. If its transfer count is zero, then the global CHECKTPC state 710 of FIG. 7 will be reentered (or the WAIT state 755, if the restart was received while in that state).

(4) If both units are targeted with the RESTART, then events (1) and (2) above apply to both units.

A further feature of the RESTART command is the ability to write a new initial and/or a new current transfer count to a transfer unit together with a RESTART command. Referring to FIG. 4F, writing a count value to INITSTC_START address 499, causes the value to be copied to both the STC and the ISTC (initial STC) registers and a RESTARTSTU 501 is performed also. Writing a count value to the WRITESTC address will update the current STC, but no restart operation occurs. Using these commands, it is possible to update either or both transfer counts for each transfer unit while also initiating an optional restart operation for the unit.

As stated earlier, restart actions can occur either by instruction (RESTART instruction), by command (written to a RESTART address on the SCB, FIG. 4F) or by signal wire, indirectly by updating a semaphore via the SIGSEMx signals. The transfer restart based on semaphores will be discussed below.

Transfer controllers can communicate events to host processors using any of three basic mechanisms: interrupt signals, messages, or semaphores. Each of these mechanisms may be operated in an explicit or an implicit fashion. Explicit operation refers to the operation being carried out by a DMA instruction. Implicit operation refers to the operation being carried out in response to an internal event after being programmed to do so. The following sections discuss explicit and implicit synchronization actions and the instructions or commands associated with them.

Whenever one of the four internal events "TPC equal to WAITPC" (TPC==WAITPC), "STU end-of-transfer" (STUEOT), "CTU end-of-transfer" (CTUEOT), "STU end-of-transfer and CTU end-of-transfer" (STUEOT&&CTUEOT) becomes TRUE an associated action can be performed if is enabled. The selection and enabling of these actions is carried out by programming two registers called event-action registers. In a presently preferred embodiment, these registers are designated EAR0 and EAR1 are shown in tables 991 and 993 of FIGS. 9G and 9I, respectively. These registers may be written directly by an SCB bus master or loaded using the LIMEAR instruction.

The EAR0 991 contains flags which enable E0 and E1 event detection and actions. The "E0" flags specify conditions that, when they become TRUE (on each transition from FALSE→TRUE), trigger the corresponding "E0" actions specified in the EAR0 and EAR1 registers. The "E1" flags specify conditions which, when they become TRUE, trigger the corresponding "E1"actions specified in the EAR0 and EAR1 registers. The "E0" and "E1" conditions are the same so that up to two independent sets of actions may be specified for the same event.

This EAR0 register also contains "restart event" fields which allow transfer restart actions to be triggered automatically when a specified semaphore is non-zero and an EOT condition is reached CTURestartCC, CTURestartSem, STURestartCC, and STURestartSem. Events are:

CTU reaches EOT condition,

STU reaches EOT condition,

CTU and STU both reach EOT condition (event does not occur unless both are at EOT), and When TPC=WAITPC (when this becomes TRUE).

Actions are:

Signal an interrupt using Signal 0 or Signal 1 or both,

Send a message using indirect address and indirect data (Areg and Dreg specifiers), Update any (or none) of four semaphores by incrementing, decrementing, clearing to zero, and Trigger a restart event to a specified transfer unit based on the value of a specified semaphore:

If (RestartCTU is enabled) AND (CTUeot is active) AND (the specified semaphore value is not zero) then the CTU restarts its current transfer automatically (reloading its current transfer count, CTC, from its initial transfer count ICTC), and decrements the semaphore atomically.

If (RestartSTU is enabled) AND (STUeot is active) AND (the specified semaphore value is not zero) then the STU restarts its current transfer automatically (reloading its current transfer count, STC, from its initial transfer count ISTC), and decrements the semaphore atomically.

Using the above signaling methods, a transfer controller can alert one or more processors when a specified condition occurs Interrupt Signals In a presently preferred embodiment, there are two interrupt signals available to each transfer controller. These may be used as inputs to processor interrupt controllers. Explicit assertion of these signals may be carried out using the SIGNAL instruction 992 of FIG. 9H. Implicit assertion of these signals may be carried out when one of the specified internal events occur by programming the EAR registers shown in FIGS. 9G and 9I, appropriately either with a host command or through the LIMEAR instruction 493 of FIG. 4C. This latter instruction simply loads the EAR registers with immediate values specified in the instruction.

Message Synchronization

In the presently preferred embodiment, a message is simply a single 32-bit write to an address mapped to the SCB, carried out by the transfer controller. A message requires specification of address and data. Explicit message generation may be carried out using the SIGNAL instruction with the address, and data may supplied as immediate values in the instruction, or with either one or both of address and data values coming from transfer controller registers. The GR registers 994 of FIG. 9J (see also FIG. 4F for additional details) may be used for storing both addresses and data for messages. Data values may also come from other selected registers such as the TPC, WAITPC, SEM and TSR registers of FIG. 4F. Implicit message actions are specified in the EAR registers of FIG. 9G and FIG. 9I based on the occurrence of one or more of the four internal events, and use a specified GR register for the address and another register as data (not limited to GR registers). Whenever a specified event becomes TRUE, the programmed message is sent. Several other features of message synchronization are the following.

Since all transfer controllers reside on the SCB, one transfer controller can synchronize with another through messages to semaphore update addresses, together with WAIT instructions.

A message may not only be a command to another transfer controller, but may also be an instruction which can be placed into a processor's instruction memory. This approach provides a mechanism for synchronizing with a host processor's execution which does not require either interrupts or polling in the usual sense.

Message capability allows a transfer controller to interact with other hardware devices on the SCB for simple configuration or control operation.

Semaphore Synchronization

In the presently preferred embodiment, there are four 8-bit hardware semaphores 1066 as illustrated in FIG. 10. Aspects of these semaphores are also shown in FIG. 5E. The semaphores 1066 may be updated and monitored by both the transfer controller and host processors in an atomic fashion.

The semaphore registers SEM provide a flexible means for synchronization of transfers at the intra-transfer (during a transfer) level and at the inter-transfer level (while processing instructions). In addition, semaphores are used as the basis for most conditional operations. Semaphores are located in the SEM registers as seen in FIG. 5E and may be updated and monitored by both the transfer controller and other bus masters on the SCB in an atomic fashion. The SIGNAL (FIG. 9H) and WAIT (FIG. 10B) instructions 992 and 1082 may be conditionally executed based on a semaphore value. The SIGNAL instruction may also specify another semaphore to update. When a WAIT instruction is executed and the specified semaphore condition is TRUE, the transfer controller halts the fetch and decode of instructions. When the condition becomes FALSE, the ECU decrements the semaphore specified by the WAIT instruction, and then allows the transfer controller to continue processing instructions.

Figure 8A:
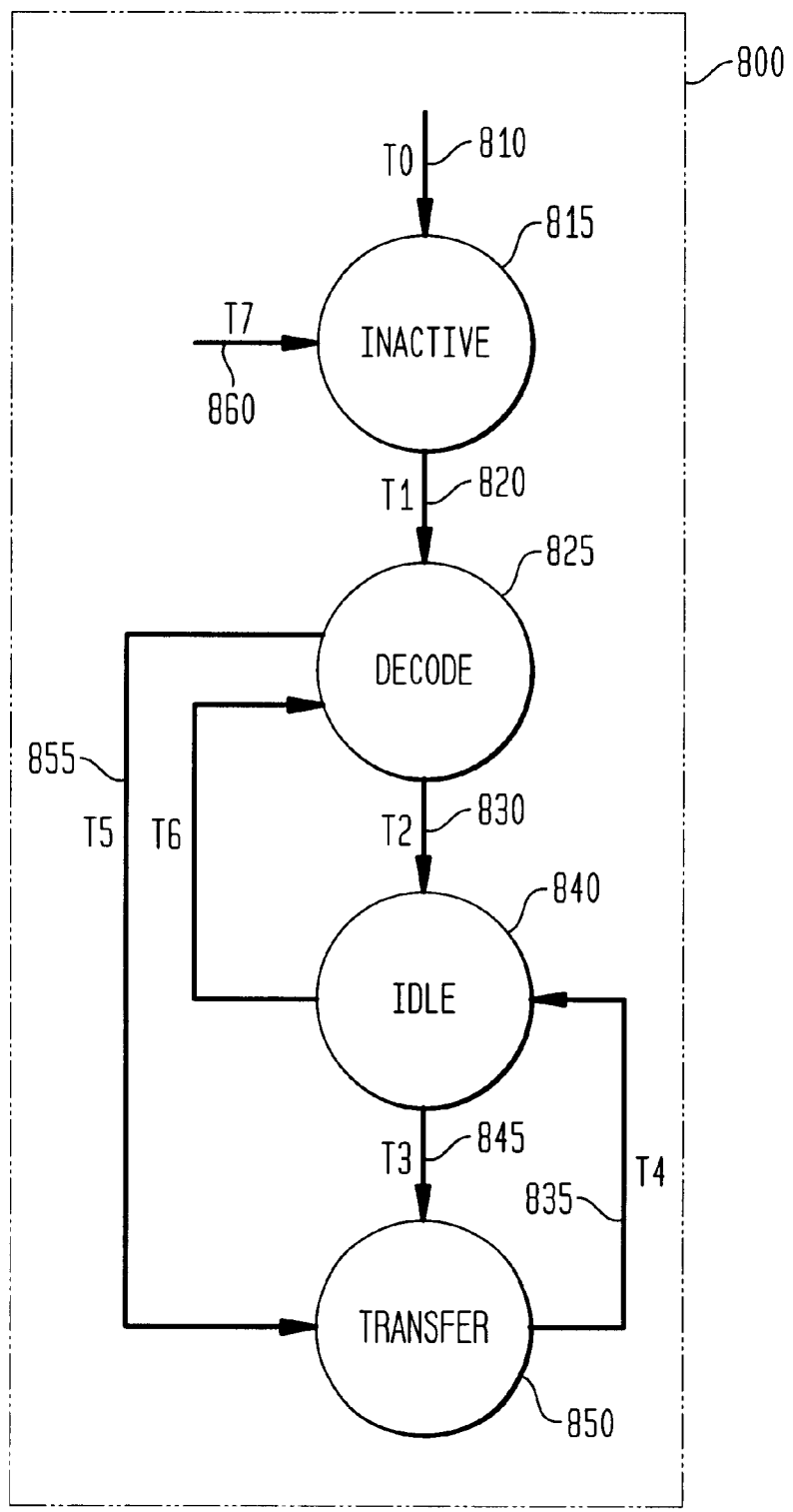
FIG. 8A shows a transfer unit state machine (either STU or CTU)

Another mechanism for semaphore based synchronization makes it possible for two host processors to control the data flow during a transfer without having to communicate directly with each other about data availability on the source side, or memory availability on the destination side. A further feature provided by the EAR registers allows, for each transfer unit, a semaphore to be specified which will cause a transfer to automatically restart if the transfer controller is in the WAIT or CHECKTPC states 755 and 710 of FIG. 7, respectively, and the transfer unit (STU or CTU) is not INACTIVE 815 as illustrated in FIG. 8A. An exemplary transfer instruction sequence 1083 is shown in FIG. 10C. A host control processor, such as processor 245 of FIG. 2, produces data into a 1 K word region of memory in 256 word blocks. Each of the 4 blocks is written with new data in sequence in a circular fashion (block 0, block 1, block 2, block 3, block O, . . . etc.). A producer block is 256 words. A consumer task running on the DSP 203 of FIG. 2 has only a 256 word region of memory in which to receive data, split into four 64 word blocks. The DSP processes each of the four 64-word blocks in sequence, also in a circular fashion. A consumer block is 64 words. Every time the producer task finishes filling a buffer, it signals semaphore S1 by writing to the appropriate command address on the SCB (INCS1). Whenever the consumer task on the DSP finishes processing a buffer, it writes to a command address which increments S0 (INCS0). The LIMEAR instruction configures the transfer controller to restart the STU anytime it is IDLE and S1 is non-zero and to restart the CTU any time it is IDLE and S0 is non-zero. When the producer task signals S1 the first time, a restart to the STU is initiated. Since the CTU has a non-zero transfer count, then the overall transfer is restarted and 64 words of data are moved to one of the consumer task's data block regions (the minimum of 256 and 64). Every time STU EOT occurs (256 words moved), the transfer controller asserts the signal0 interrupt (to the producer task on the host processor) and every time CTU EOT occurs (64 words moved) a message is sent to an "mbox1" address for DSP notification. It is assumed that the producer and consumer tasks each keep track of the data that has been moved using local semaphores that are updated based on the signal0 interrupt to the producer task and the message to the consumer task. Using the code of FIG. 10C, the producer task is able to generate data at its own rate, and the consumer task processes the data at its own rate. There is no additional communication overhead required between the two tasks.

DMA-to-DMA and DMA-I/O Device Transfers

Each transfer controller supports an SDB-slave address range which may be used to directly read and write from and to the corresponding ODQ or IDQ when the lane's STU is in an inactive state. For example, a DMA transfer from SP data memory to PE data memories may be carried out by the following instruction sequences executed by transfer controller 1 and transfer controller 0:

Lane 1:

Clear STU—This makes the STU capable of receiving slave requests for IDQ FIFO access.

Transfer instruction—Transfer Core Inbound to PE Data address, "transfer count" words Lane 0:

Control instruction—setup event-action register to signal interrupt at EOT

Transfer instruction—Transfer Core Outbound from SP Data addresses, "transfer count" words Transfer instruction—Transfer System Outbound to SDB slave address(es) of Lane 1, "transfer count" words. Lane 1 STU will write data to its IDQ.

Note that two transfer controllers are used to carry out DMA-DMA transfers (or one Transfer Controller and another SDB-master).

This same mechanism can be used by any device on the SDB to read/write to a lane's data queues, allowing one DMA controller or I/O device to read/write data to another. The discussion shows how general "pull" and "push" model DMA-DMA transfers can be implemented.

A "push" model DMA-DMA transfer means that the transfer controller which is reading the data source acts as the SDB master and writes data to the SDB slave address range of another transfer controller which is writing data to a destination memory. In this case, the source transfer controller is executing a TCO, TSO pair of instructions and the destination transfer controller is executing only a TCI instruction with the STU inactive (operating as a slave for SDB write access).

A "pull" model DMA-DMA transfer means that the transfer controller which is writing the data to its destination memory acts as the SDB master and reads data from the SDB slave address range of another transfer controller which is reading data from a source memory. In this case, the destination transfer controller is executing a TSI, TCI pair of instructions and the source transfer controller is executing only a TCO instruction with the STU inactive (operating as a slave for SDB write access).

To support a "pull" model DMA-to-DMA or I/O-to-DMA transfer:

Place STU of source DMA into the inactive state (by instruction or command).

Program source CTU with an instruction which gathers data from the desired memories and starts the transfer. This causes the FIFO to be filled but the STU is inactive so that the FIFO will only respond to reads from the source transfer controller's SDB slave port.

Program the destination STU with a TSI.IO instruction using the source DMA's SDB slave address as the I/O transfer address to read from. Program the destination CTU with the desired transfer type for distributing data to destination memories and start the transfer.

The destination DMA Transfer Controller will "pull" data from the source DMA transfer controller until either the source or the destination transfer unit reaches an end-of-transfer (EOT) condition (the number of items transferred is equal to transfer count requested). Semaphores may be used to make the setup and execution of the transfer almost entirely occur in the background.

To support a "push" model DMA-to-DMA or I/O-to-DMA transfer:

Place STU of destination DMA into the inactive state (by instruction or command).

Program destination CTU with an instruction which distributes data to the desired memories and start the transfer. This causes the CTU to wait for data to arrive in the inbound FIFO. The STU is inactive so that the FIFO will only respond to writes from the source transfer controller's STU.

Program the source STU with a TSO.IO instruction using the destination DMA's SDB slave address as the I/O transfer address to write to. Program the source CTU with the desired transfer type for gathering data from source memories and start the transfer.

The source DMA transfer controller will "push" data into the destination DMA transfer controller's inbound FIFO until either the source or the destination transfer unit reaches an end-of-transfer (EOT) condition (items transferred is equal to transfer count requested). Semaphores may be used to make the setup and execution of the transfer almost entirely occur in the background.

Update transfers are special instructions that allow an already loaded transfer to be updated with a new direction, transfer count or new target address (or all three) without affecting other parameters or state. These types of transfers are useful for minimizing DMA instruction space when processing transfers that are similar to each other. An update-type instruction is specified as a variation of a TCI, TSI, TCO or TSO instruction, for example,

```
tci.update tc=200, addr=0x1000;
```

The above instruction will update the direction, transfer count and starting address of a transfer instruction that is already loaded into the CTU. No other parameters are affected.

The instruction tso.update tc=10 will update only the transfer count of the instruction currently loaded into the STU affecting no other parameters.

Resources Supporting Transfer Synchronization

Figure 10A:
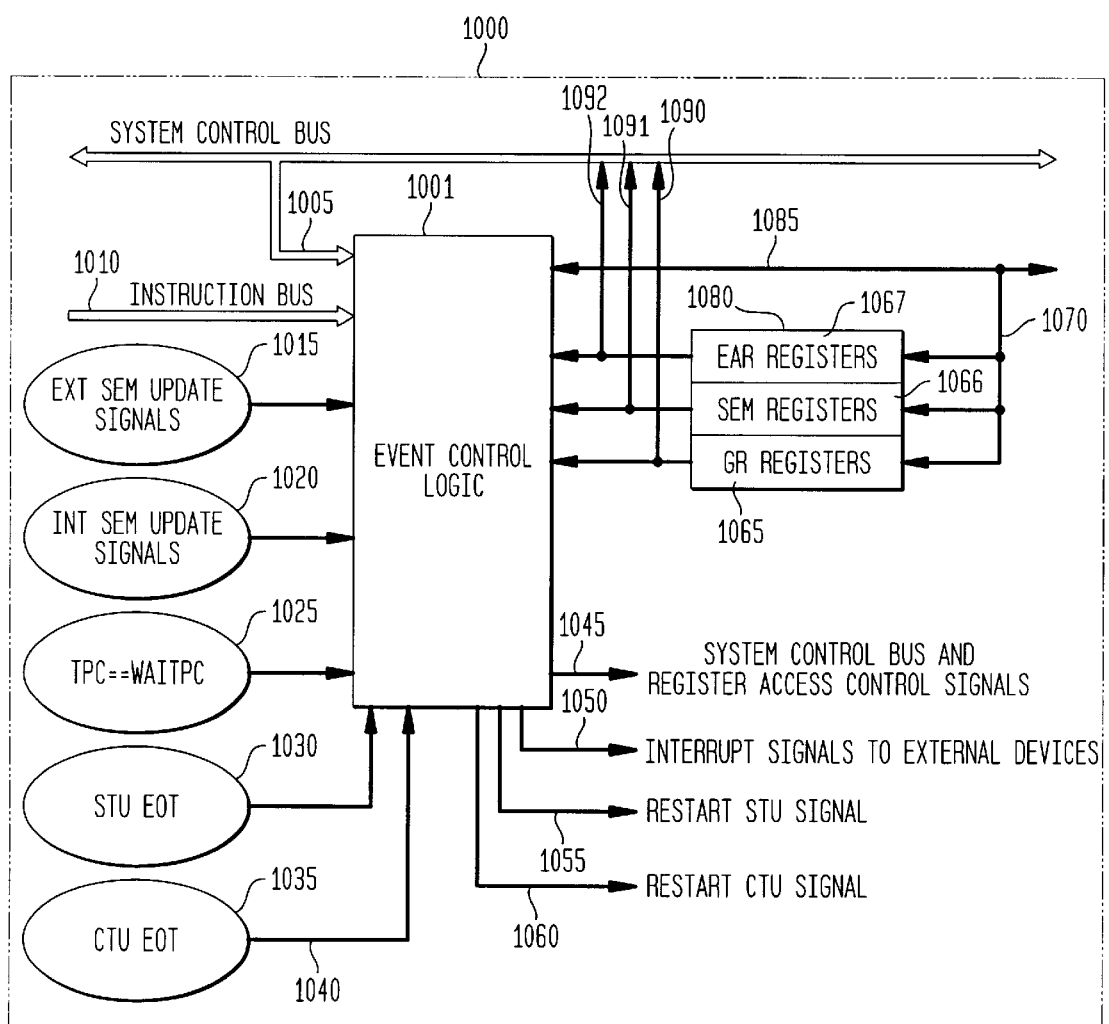
FIG. 10A shows an event control unit.

FIG. 10A shows an ECU (event control unit) 1000 employing event control logic 1001 and the registers and signals it controls. EAR registers (event-action registers) 1080 specify internal events to be monitored and corresponding actions to take when they occur. SEM registers 1066 support conditional execution of branch instructions and synchronization instructions, and may be used to generate restart actions to either of the two transfer units when programmed to do so in the EAR registers. They may be updated in three ways: by commands on SCB 1005; by branch and synchronization instructions 1010; and by signals from external devices 1015. GR registers 1065 may be used to provide address and data for synchronization messages to be sent out on the SCB when specified internal events occur. These are specified in EAR registers 1067. In addition, the event control logic STU EOT 1030 monitors outputs from the STU, CTU EOT 1035 from the CTU, the result of the equality comparison of TPC and WAITPC 1025, and the SCB for commands from an SCB bus master, to update, to modify, or to read registers as desired. Based on the programmed register values, the ECU 1001 generates interrupt signals to external devices 1050, and restart signals to the STU 1055 and CTU 1060. Various other internal control signals 1045 are generated to control access to the SCB and to the registers.

While the present invention is disclosed in a presently preferred context, it will be recognized that the teachings of the present invention may be variously embodied consistent with the disclosure and claims. By way of example, the present invention is disclosed in connection with specific aspects of the ManArray architecture. It will be recognized that the present teachings may be adapted to other present and future architectures to which they may be beneficial.

We claim:

1. An instruction format for a transfer instruction comprising:

a base opcode field indicating that an instruction is of the transfer type;

a C/S field indicating that a transfer unit for the instruction is a core transfer unit or a system transfer unit;

an I/O field indicates whether the transfer direction is inbound or outbound;

a data type field indicates the size of each element transferred;

an address mode refers to a data access pattern which must be generated by the transfer unit;

a transfer count indicates the number of data elements of the size defined by the data type field are to be transferred to or from a target memory or device before an end of transfer (EOT) occurs for that memory or device; and an address field specifies a starting address for the transfer.

2. The instruction format of claim 1 further comprising an execute (X) field which when set to "1" indicates a start transfer event.

3. The instruction format of claim 1 further comprising an execute (X) field which when set to "0", parameters are loaded into a specified unit, but instruction fetching or decoding continues until a start transfer event occurs.

* * * * *